United States Patent
Kim et al.

(10) Patent No.: US 11,968,692 B2
(45) Date of Patent: Apr. 23, 2024

(54) METHOD AND APPARATUS FOR TRANSMITTING AND RECEIVING WIRELESS SIGNAL IN WIRELESS COMMUNICATION SYSTEM

(71) Applicant: LG ELECTRONICS INC., Seoul (KR)

(72) Inventors: Seonwook Kim, Seoul (KR); Suckchel Yang, Seoul (KR); Youngdae Lee, Seoul (KR); Joonkui Ahn, Seoul (KR); Inkwon Seo, Seoul (KR); Daesung Hwang, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

(21) Appl. No.: 18/223,798

(22) Filed: Jul. 19, 2023

(65) Prior Publication Data
US 2023/0371034 A1    Nov. 16, 2023

Related U.S. Application Data

(63) Continuation of application No. 17/796,249, filed as application No. PCT/KR2021/001260 on Jan. 29, 2021.
(Continued)

(30) Foreign Application Priority Data

Jan. 29, 2020  (KR) .................. 10-2020-0010690
Oct. 15, 2020  (KR) .................. 10-2020-0133321
Jan. 15, 2021  (KR) .................. 10-2021-0006320

(51) Int. Cl.
H04W 72/12    (2023.01)
H04L 5/00     (2006.01)
(Continued)

(52) U.S. Cl.
CPC ....... *H04W 72/23* (2023.01); *H04W 72/0446* (2013.01)

(58) Field of Classification Search
CPC .................... H04W 72/23; H04W 72/0446
See application file for complete search history.

(56) References Cited

U.S. PATENT DOCUMENTS

2014/0198748 A1    7/2014  Lee et al.
2015/0304086 A1    10/2015 Kim et al.
(Continued)

OTHER PUBLICATIONS

Samsung, R1-1913197, 'Introduction of Ultra Reliable Low Latency Communications Enhancements', 3GPP TSG-RAN Meeting #99 , Nov. 18-22, 2019, pp. 1-41. (Year: 2019).*
(Continued)

*Primary Examiner* — Melvin C Marcelo
(74) *Attorney, Agent, or Firm* — BRYAN CAVE LEIGHTON PAISNER LLP

(57) ABSTRACT

The present disclosure relates to a wireless communication system and, more particularly, to a method and an apparatus therefor, the method comprising the steps of: monitoring first PDCCH candidates for a second cell in a first SS of a first cell; on the basis of the second cell being PCell, monitoring second PDCCH candidates for the second cell even in a second SS of the second cell; and on the basis of a PDCCH detected from among the first and second PDCCH candidates, performing transmission or reception of data corresponding to the PDCCH.

10 Claims, 13 Drawing Sheets

Related U.S. Application Data

(60) Provisional application No. 63/104,490, filed on Oct. 22, 2020.

(51) Int. Cl.
*H04W 72/0446* (2023.01)
*H04W 72/23* (2023.01)
*H04W 76/15* (2018.01)

(56) References Cited

U.S. PATENT DOCUMENTS

2018/0359740 A1   12/2018  Santori et al.
2023/0284240 A1\*  9/2023  Saber .................. H04W 72/232
                                                                         370/329

OTHER PUBLICATIONS

R1-1913197: Samsung, "Introduction of Ultra Reliable Low Latency Communications Enhancement"; 3GPP TSG-RAN WG1 Meeting #99, Reno, USA, Nov. 17, 2019 (42 Pages).
3GPP TS 38.331 V15.8.0: 3GPP TSG RAN; NR RRC Protocol Specification (Release 15)'; Jan. 8, 2020 (532 Pages).

\* cited by examiner

FIG. 10

|  | Slot#n | | | Slot# n+1 |
|---|---|---|---|---|
| PCell | CSS index 0 (30) | USS index 1 (10) | USS index 2 (8) | |
| SCell | USS index 1 (12) | USS index 1 (12) | | USS index 2 (5) |

METHOD AND APPARATUS FOR TRANSMITTING AND RECEIVING WIRELESS SIGNAL IN WIRELESS COMMUNICATION SYSTEM

This application is a Continuation Application of U.S. patent application Ser. No. 17/796,249, filed on Jul. 28, 2022, which is a National Stage of International Application No. PCT/KR2021/001260, filed on Jan. 29, 2021 which claims the benefit of U.S. Provisional Application No. 63/104,490, filed on Oct. 22, 2020, Korean Application No. 10-2020-0010690, filed on Jan. 29, 2020, Korean Application No. 10-2020-0133321, filed on Oct. 15, 2020, and Korean Application No. 10-2021-0006320, filed on Jan. 15, 2021 the contents of which are all hereby incorporated by reference herein in their entirety.

TECHNICAL FIELD

The present disclosure relates to a wireless communication system, and more particularly, to a method and apparatus for transmitting/receiving a wireless signal.

BACKGROUND ART

Generally, a wireless communication system is developing to diversely cover a wide range to provide such a communication service as an audio communication service, a data communication service and the like. The wireless communication is a sort of a multiple access system capable of supporting communications with multiple users by sharing available system resources (e.g., bandwidth, transmit power, etc.). For example, the multiple access system may include one of CDMA (code division multiple access) system, FDMA (frequency division multiple access) system, TDMA (time division multiple access) system, OFDMA (orthogonal frequency division multiple access) system, SC-FDMA (single carrier frequency division multiple access) system and the like.

DISCLOSURE

Technical Problem

An object of the present disclosure is to provide a method of efficiently performing wireless signal transmission/reception procedures and an apparatus therefor.

It will be appreciated by persons skilled in the art that the objects that could be achieved with the present disclosure are not limited to what has been particularly described hereinabove and the above and other objects that the present disclosure could achieve will be more clearly understood from the following detailed description.

Technical Solution

In a first aspect of the present disclosure, provided herein is a method of performing communication by a terminal in a wireless communication system. The method may include monitoring first Physical Downlink Control Channel (PDCCH) candidates in a first search space (SS) of a first cell for a second cell, based on the second cell being a PCell, monitoring second PDCCH candidates for the second cell in a second SS of the second cell, and based on a PDCCH detected from among the first and second PDCCH candidates, transmitting or receiving data corresponding to the PDCCH.

In a second aspect of the present disclosure, provided herein is a terminal used in a wireless communication system, including at least one radio frequency (RF) unit, at least one processor, and at least one computer memory operatively coupled to the at least one processor and configured to cause, when executed, the at least one processor to perform an operation. The operation may include monitoring first Physical Downlink Control Channel (PDCCH) candidates in a first search space (SS) of a first cell for a second cell, based on the second cell being a PCell, monitoring second PDCCH candidates for the second cell in a second SS of the second cell, and based on a PDCCH detected from among the first and second PDCCH candidates, transmitting or receiving data corresponding to the PDCCH.

In a third aspect of the present disclosure, provided herein is a device for a terminal, including at least one radio frequency (RF) unit, at least one processor, and at least one computer memory operatively coupled to the at least one processor and configured to cause, when executed, the at least one processor to perform an operation. The operation may include monitoring first Physical Downlink Control Channel (PDCCH) candidates in a first search space (SS) of a first cell for a second cell, based on the second cell being a PCell, monitoring second PDCCH candidates for the second cell in a second SS of the second cell, and based on a PDCCH detected from among the first and second PDCCH candidates, transmitting or receiving data corresponding to the PDCCH.

In a fourth aspect of the present disclosure, provided herein is a computer-readable storage medium may include at least one computer program that, when executed, causes at least one processor to perform an operation. The operation may include monitoring first Physical Downlink Control Channel (PDCCH) candidates in a first search space (SS) of a first cell for a second cell, based on the second cell being a PCell, monitoring second PDCCH candidates for the second cell in a second SS of the second cell, and based on a PDCCH detected from among the first and second PDCCH candidates, transmitting or receiving data corresponding to the PDCCH.

In a fifth aspect of the present disclosure, provided herein is a method of performing communication by a base station in a wireless communication system. The method may include configuring first Physical Downlink Control Channel (PDCCH) candidates in a first search space (SS) of a first cell for a second cell, based on the second cell being a PCell, configuring second PDCCH candidates for the second cell in a second SS of the second cell, and based on a PDCCH being transmitted among the first and second PDCCH candidates, transmitting or receiving data corresponding to the PDCCH.

In a sixth aspect of the present disclosure, provided herein is a base station used in a wireless communication system, including at least one radio frequency (RF) unit, at least one processor, and at least one computer memory operatively coupled to the at least one processor and configured to cause, when executed, the at least one processor to perform an operation. The operation may include configuring first Physical Downlink Control Channel (PDCCH) candidates in a first search space (SS) of a first cell for a second cell, based on the second cell being a PCell, configuring second PDCCH candidates for the second cell in a second SS of the second cell, and based on a PDCCH being transmitted among the first and second PDCCH candidates, transmitting or receiving data corresponding to the PDCCH.

The first SS may be a UE-specific SS (USS), and the second SS of the second cell is a common SS (CSS).

Based on the second cell being an SCell, monitoring/configuration of a PDCCH candidate for the second cell may be skipped in the second SS of the second cell.

The first SS of the first cell may be an SS indicated by a higher layer signal among a plurality of SSs configured for the first cell or by downlink control information (DCI) received through a common SS in the PCell.

Based on the first cell being deactivated, the monitoring/configuration of the PDCCH candidates for the first cell may be stopped, and the monitoring/configuration of the PDCCH candidates for the second cell may be maintained.

The monitoring/configuration of the second PDCCH candidates for the second cell may include, based on the number of PDCCH candidates configured in a slot exceeding a maximum number, skipping monitoring a part of the PDCCH candidates configured in the slot. Based on the second cell being a PCell, the number of PDCCH candidates configured in the slot may be determined in consideration of the number of PDCCH candidates configured in the first SS of the first cell and the second SS of the second cell.

Advantageous Effects

According to the present disclosure, wireless signal transmission and reception may be efficiently performed in a wireless communication system.

It will be appreciated by persons skilled in the art that the effects that can be achieved with the present disclosure are not limited to what has been particularly described hereinabove and other advantages of the present disclosure will be more clearly understood from the following detailed description taken in conjunction with the accompanying drawings.

DESCRIPTION OF DRAWINGS

The accompanying drawings, which are included to provide a further understanding of the disclosure and are incorporated in and constitute a part of this application, illustrate embodiments of the disclosure and together with the description serve to explain the principle of the disclosure. In the drawings:

FIGS. 9 to 12 illustrate a scheduling method according to an example of the present disclosure.

MODE FOR DISCLOSURE

Embodiments of the present disclosure are applicable to a variety of wireless access technologies such as code division multiple access (CDMA), frequency division multiple access (FDMA), time division multiple access (TDMA), orthogonal frequency division multiple access (OFDMA), and single carrier frequency division multiple access (SC-FDMA). CDMA can be implemented as a radio technology such as Universal Terrestrial Radio Access (UTRA) or CDMA2000. TDMA can be implemented as a radio technology such as Global System for Mobile communications (GSM)/General Packet Radio Service (GPRS)/Enhanced Data Rates for GSM Evolution (EDGE). OFDMA can be implemented as a radio technology such as Institute of Electrical and Electronics Engineers (IEEE) 802.11 (Wireless Fidelity (Wi-Fi)), IEEE 802.16 (Worldwide interoperability for Microwave Access (WiMAX)), IEEE 802.20, and Evolved UTRA (E-UTRA). UTRA is a part of Universal Mobile Telecommunications System (UMTS). 3rd Generation Partnership Project (3GPP) Long Term Evolution (LTE) is part of Evolved UMTS (E-UMTS) using E-UTRA, and LTE-Advanced (A) is an evolved version of 3GPP LTE. 3GPP NR (New Radio or New Radio Access Technology) is an evolved version of 3GPP LTE/LTE-A.

As more and more communication devices require a larger communication capacity, there is a need for mobile broadband communication enhanced over conventional radio access technology (RAT). In addition, massive Machine Type Communications (MTC) capable of providing a variety of services anywhere and anytime by connecting multiple devices and objects is another important issue to be considered for next generation communications. Communication system design considering services/UEs sensitive to reliability and latency is also under discussion. As such, introduction of new radio access technology considering enhanced mobile broadband communication (eMBB), massive MTC, and Ultra-Reliable and Low Latency Communication (URLLC) is being discussed. In the present disclosure, for simplicity, this technology will be referred to as NR (New Radio or New RAT).

For the sake of clarity, 3GPP NR is mainly described, but the technical idea of the present disclosure is not limited thereto.

In a wireless communication system, a user equipment (UE) receives information through downlink (DL) from a base station (BS) and transmit information to the BS through uplink (UL). The information transmitted and received by the BS and the UE includes data and various control information and includes various physical channels according to type/usage of the information transmitted and received by the UE and the BS.

Figure 1:
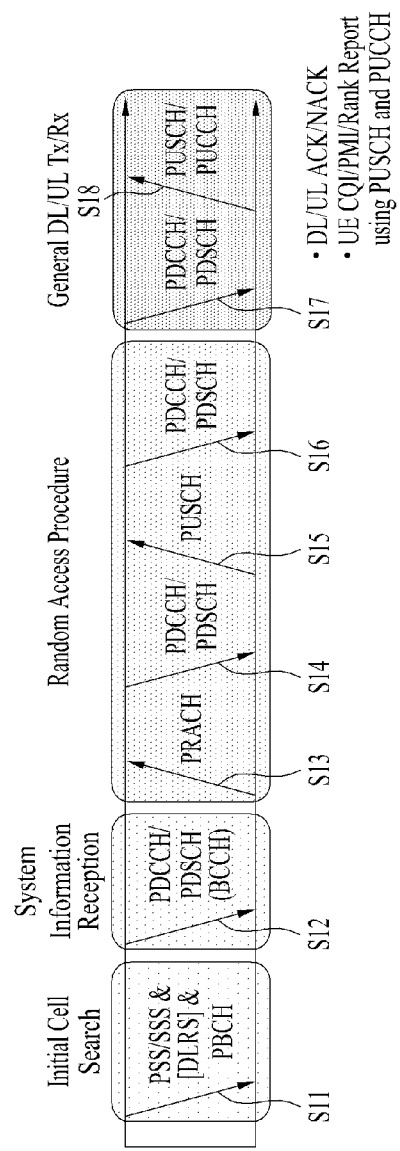
FIG. 1 illustrates physical channels used in a 3rd generation partnership project (3GPP) system, which is an example of wireless communication systems, and a general signal transmission method using the same.

FIG. 1 illustrates physical channels used in a 3GPP NR system and a general signal transmission method using the same.

When a UE is powered on again from a power-off state or enters a new cell, the UE performs an initial cell search procedure, such as establishment of synchronization with a BS, in step S101. To this end, the UE receives a synchronization signal block (SSB) from the BS. The SSB includes a primary synchronization signal (PSS), a secondary synchronization signal (SSS), and a physical broadcast channel (PBCH). The UE establishes synchronization with the BS based on the PSS/SSS and acquires information such as a cell identity (ID). The UE may acquire broadcast information in a cell based on the PBCH. The UE may receive a DL reference signal (RS) in an initial cell search procedure to monitor a DL channel status.

After initial cell search, the UE may acquire more specific system information by receiving a physical downlink control channel (PDCCH) and receiving a physical downlink shared channel (PDSCH) based on information of the PDCCH in step S102.

The UE may perform a random access procedure to access the BS in steps S103 to S106. For random access, the UE may transmit a preamble to the BS on a physical random access channel (PRACH) (S103) and receive a response message for preamble on a PDCCH and a PDSCH corresponding to the PDCCH (S104). In the case of contention-based random access, the UE may perform a contention resolution procedure by further transmitting the PRACH (S105) and receiving a PDCCH and a PDSCH corresponding to the PDCCH (S106).

After the foregoing procedure, the UE may receive a PDCCH/PDSCH (S107) and transmit a physical uplink shared channel (PUSCH)/physical uplink control channel (PUCCH) (S108), as a general downlink/uplink signal transmission procedure. Control information transmitted from the UE to the BS is referred to as uplink control information (UCI). The UCI includes hybrid automatic repeat and request acknowledgement/negative-acknowledgement (HARQ-ACK/NACK), scheduling request (SR), channel state information (CSI), etc. The CSI includes a channel quality indicator (CQI), a precoding matrix indicator (PMI), a rank indicator (RI), etc. While the UCI is transmitted on a PUCCH in general, the UCI may be transmitted on a PUSCH when control information and traffic data need to be simultaneously transmitted. In addition, the UCI may be aperiodically transmitted through a PUSCH according to request/command of a network.

Figure 2:
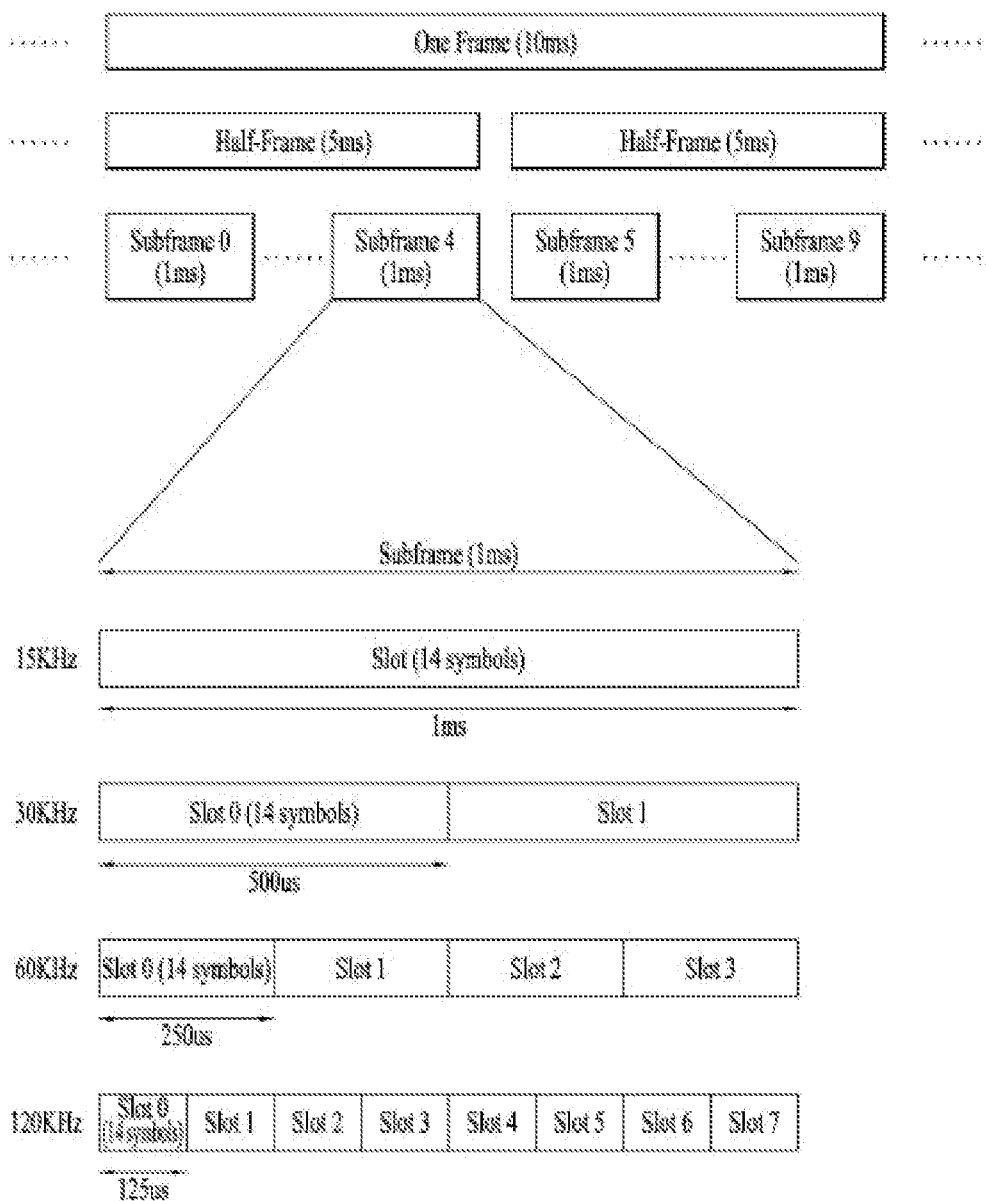
FIG. 2 illustrates a radio frame structure.

FIG. 2 illustrates a radio frame structure. In NR, uplink and downlink transmissions are configured with frames. Each radio frame has a length of 10 ms and is divided into two 5-ms half-frames (HF). Each half-frame is divided into five 1-ms subframes (SFs). A subframe is divided into one or more slots, and the number of slots in a subframe depends on subcarrier spacing (SCS). Each slot includes 12 or 14 Orthogonal Frequency Division Multiplexing (OFDM) symbols according to a cyclic prefix (CP). When a normal CP is used, each slot includes 14 OFDM symbols. When an extended CP is used, each slot includes 12 OFDM symbols.

Table 1 exemplarily shows that the number of symbols per slot, the number of slots per frame, and the number of slots per subframe vary according to the SCS when the normal CP is used.

TABLE 1

| SCS (15 * 2^u) | Nslotsymb | Nframe,uslot | Nsubframe,uslot |
|---|---|---|---|
| 15 KHz (u = 0) | 14 | 10 | 1 |
| 30 KHz (u = 1) | 14 | 20 | 2 |
| 60 KHz (u = 2) | 14 | 40 | 4 |
| 120 KHz (u = 3) | 14 | 80 | 8 |
| 240 KHz (u = 4) | 14 | 160 | 16 |

*$N^{slot}_{symb}$: Number of symbols in a slot

*$N^{frame,u}_{slot}$: Number of slots in a frame

*$N^{subframe,u}_{slot}$: Number of slots in a subframe

Table 2 illustrates that the number of symbols per slot, the number of slots per frame, and the number of slots per subframe vary according to the SCS when the extended CP is used.

TABLE 2

| SCS (15 * 2^u) | Nslotsymb | Nframe,uslot | Nsubframe,uslot |
|---|---|---|---|
| 60 KHz (u = 2) | 12 | 40 | 4 |

The structure of the frame is merely an example. The number of subframes, the number of slots, and the number of symbols in a frame may vary.

In the NR system, OFDM numerology (e.g., SCS) may be configured differently for a plurality of cells aggregated for one UE. Accordingly, the (absolute time) duration of a time resource (e.g., an SF, a slot or a TTI) (for simplicity, referred to as a time unit (TU)) consisting of the same number of symbols may be configured differently among the aggregated cells. Here, the symbols may include an OFDM symbol (or a CP-OFDM symbol) and an SC-FDMA symbol (or a discrete Fourier transform-spread-OFDM (DFT-s-OFDM) symbol).

Figure 3:
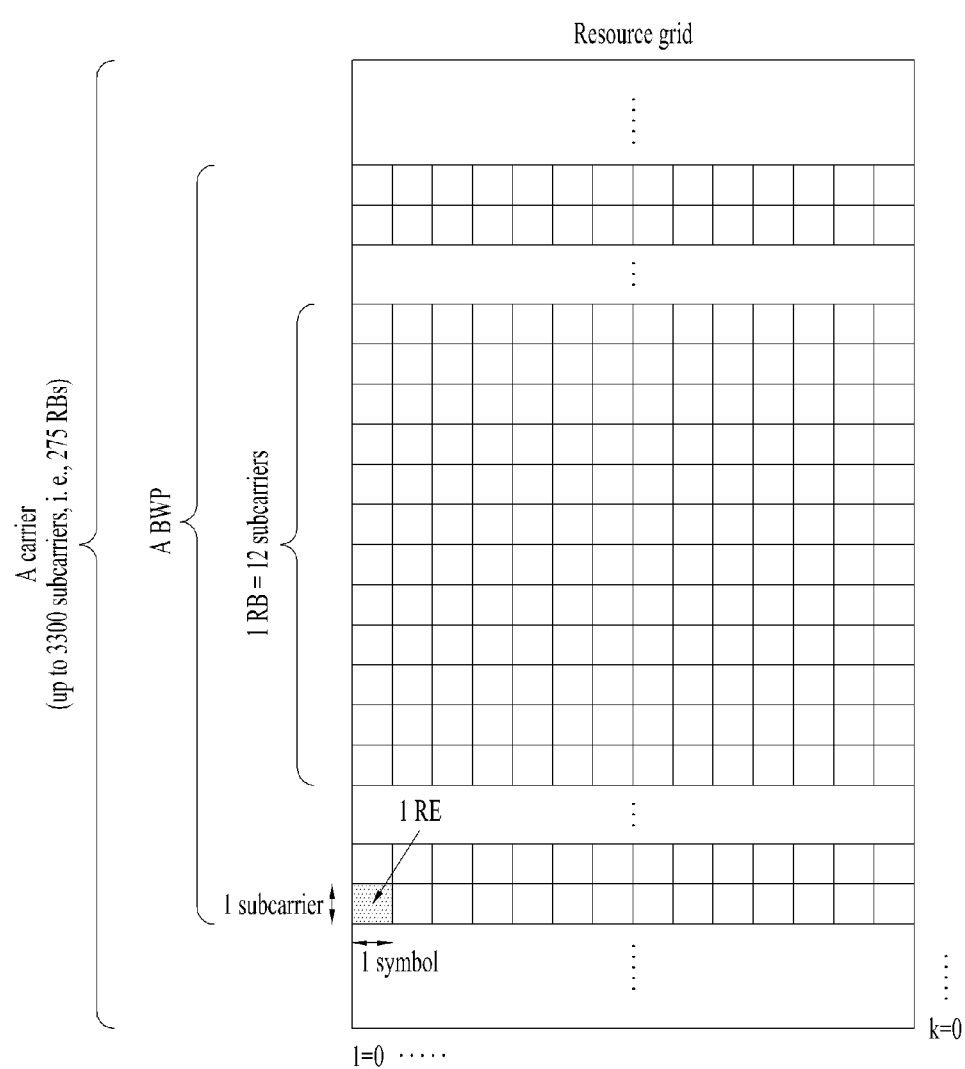
FIG. 3 illustrates a resource grid of a slot.

FIG. 3 illustrates a resource grid of a slot. A slot includes a plurality of symbols in the time domain. For example, when the normal CP is used, the slot includes 14 symbols. However, when the extended CP is used, the slot includes 12 symbols. A carrier includes a plurality of subcarriers in the frequency domain. A resource block (RB) is defined as a plurality of consecutive subcarriers (e.g., 12 consecutive subcarriers) in the frequency domain. A bandwidth part (BWP) may be defined to be a plurality of consecutive physical RBs (PRBs) in the frequency domain and correspond to a single numerology (e.g., SCS, CP length, etc.). The carrier may include up to N (e.g., 5) BWPs. Data communication may be performed through an activated BWP, and only one BWP may be activated for one UE. In the resource grid, each element is referred to as a resource element (RE), and one complex symbol may be mapped to each RE.

Figure 4:
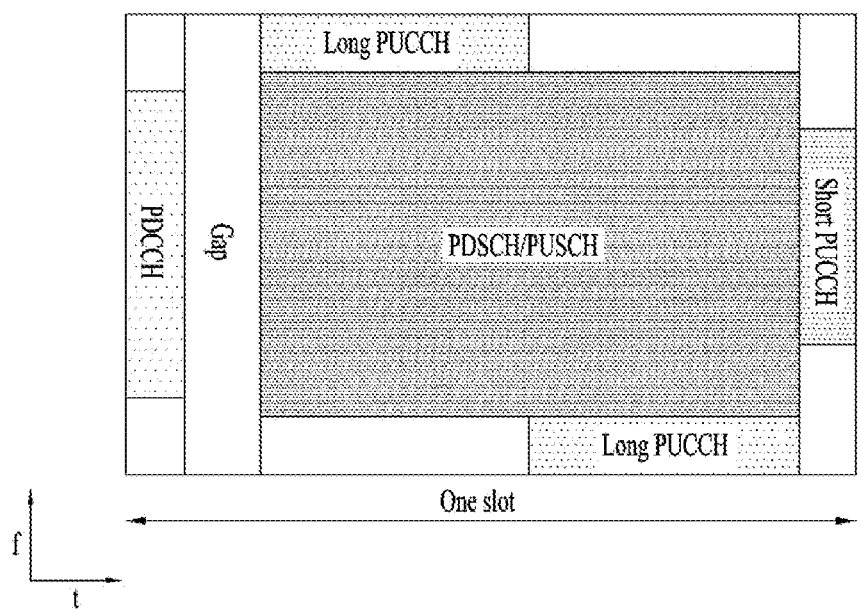
FIG. 4 illustrates exemplary mapping of physical channels in a slot.

FIG. 4 illustrates exemplary mapping of physical channels in a slot. In the NR system, a frame is characterized by a self-contained structure in which all of a DL control channel, DL or UL data, and a UL control channel may be included in one slot. For example, the first N symbols (hereinafter, referred to as a DL control region) of a slot may be used to transmit a DL control channel (e.g., PDCCH), and the last M symbols (hereinafter, referred to as a UL control region) of the slot may be used to transmit a UL control channel (e.g., PUCCH). Each of N and M is an integer equal to or larger than 0. A resource region (hereinafter, referred to as a data region) between the DL control region and the UL control region may be used to transmit DL data (e.g., PDSCH) or UL data (e.g., PUSCH). A guard period (GP) provides a time gap for transmission mode-to-reception mode switching or reception mode-to-transmission mode switching at a BS and a UE. Some symbol at the time of DL-to-UL switching in a subframe may be configured as a GP.

The PDCCH delivers DCI. For example, the PDCCH (i.e., DCI) may carry information about a transport format and resource allocation of a DL shared channel (DL-SCH), resource allocation information of an uplink shared channel (UL-SCH), paging information on a paging channel (PCH), system information on the DL-SCH, information on resource allocation of a higher-layer control message such as an RAR transmitted on a PDSCH, a transmit power control command, information about activation/release of configured scheduling, and so on. The DCI includes a cyclic redundancy check (CRC). The CRC is masked with various identifiers (IDs) (e.g. a radio network temporary identifier (RNTI)) according to an owner or usage of the PDCCH. For example, if the PDCCH is for a specific UE, the CRC is masked by a UE ID (e.g., cell-RNTI (C-RNTI)). If the PDCCH is for a paging message, the CRC is masked by a paging-RNTI (P-RNTI). If the PDCCH is for system information (e.g., a system information block (SIB)), the CRC is masked by a system information RNTI (SI-RNTI). When the PDCCH is for an RAR, the CRC is masked by a random access-RNTI (RA-RNTI).

Figure 5:
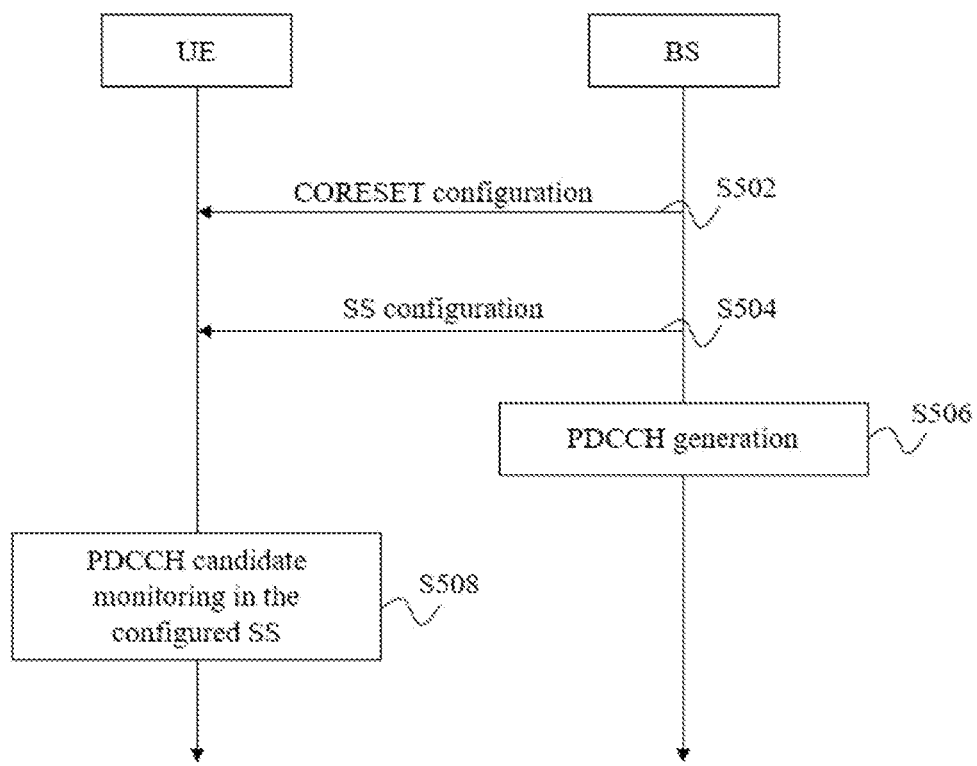
FIG. 5 is a diagram illustrating a signal flow for a physical downlink control channel (PDCCH) transmission and reception process.

FIG. 5 is a diagram illustrating a signal flow for a PDCCH transmission and reception process.

Referring to FIG. 5, a BS may transmit a control resource set (CORESET) configuration to a UE (S502). A CORESET is defined as a set of resource element groups (REGs) having a given numerology (e.g., an SCS, a CP length, and so on). An REG is defined as one OFDM symbol by one (P)RB. A plurality of CORESETs for one UE may overlap with each other in the time/frequency domain. A CORESET may be configured by system information (e.g., a master information block (MIB)) or UE-specific higher-layer signaling (e.g., radio resource control (RRC) signaling). The UE-specific RRC signaling may include, for example, an RRC setup message, BWP configuration information, and so on.

controlResourceSetId: indicates the ID of a CORESET.

frequencyDomainResources: indicates the frequency resources of the CORESET. The frequency resources of the CORESET are indicated by a bitmap in which each bit corresponds to an RBG (e.g., six (consecutive) RBs). For example, the most significant bit (MSB) of the bitmap corresponds to a first RBG. RBGs corresponding to bits set to 1 are allocated as the frequency resources of the CORESET.

duration: indicates the time resources of the CORESET. Duration indicates the number of consecutive OFDM symbols included in the CORESET. Duration has a value of 1 to 3.

cce-REG-MappingType: indicates a control channel element (CCE)-REG mapping type. Interleaved and non-interleaved types are supported.

interleaverSize: indicates an interleaver size.

pdcch-DMRS-ScramblingID: indicates a value used for PDCCH DMRS initialization. When pdcch-DMRS-ScramblingID is not included, the physical cell ID of a serving cell is used.

precoderGranularity: indicates a precoder granularity in the frequency domain.

reg-BundleSize: indicates an REG bundle size.

tci-PresentInDCI: indicates whether a transmission configuration index (TCI) field is included in DL-related DCI.

tci-StatesPDCCH-ToAddList: indicates a subset of TCI states configured in pdcch-Config, used for providing quasi-co-location (QCL) relationships between DL RS(s) in an RS set (TCI-State) and PDCCH DMRS ports.

Further, the BS may transmit a PDCCH search space (SS) configuration to the UE (S504). A PDCCH SS set includes PDCCH candidates. A PDCCH candidate is CCE(s) that the UE monitors to receive/detect a PDCCH. The monitoring includes blind decoding (BD) of PDCCH candidates. One PDCCH (candidate) includes 1, 2, 4, 8, or 16 CCEs according to an aggregation level (AL). One CCE includes 6 REGs. Each CORESET configuration is associated with one or more SSs, and each SS is associated with one CORESET configuration. One SS is defined based on one SS configuration, and the SS configuration may include the following information/fields.

searchSpaceId: indicates the ID of an SS.

controlResourceSetId: indicates a CORESET associated with the SS.

monitoringSlotPeriodicityAndOffset: indicates a periodicity (in slots) and offset (in slots) for PDCCH monitoring.

monitoringSymbolsWithinSlot: indicates the first OFDM symbol(s) for PDCCH monitoring in a slot configured with PDCCH monitoring. The first OFDM symbol(s) for PDCCH monitoring is indicated by a bitmap with each bit corresponding to an OFDM symbol in the slot. The MSB of the bitmap corresponds to the first OFDM symbol of the slot. OFDM symbol(s) corresponding to bit(s) set to 1 corresponds to the first symbol(s) of a CORESET in the slot.

nrofCandidates: indicates the number of PDCCH candidates (one of values 0, 1, 2, 3, 4, 5, 6, and 8) for each AL where AL={1, 2, 4, 8, 16}.

searchSpaceType: indicates common search space (CSS) or UE-specific search space (USS) as well as a DCI format used in the corresponding SS type.

Subsequently, the BS may generate a PDCCH and transmit the PDCCH to the UE (S506), and the UE may monitor PDCCH candidates in one or more SSs to receive/detect the PDCCH (S508). An occasion (e.g., time/frequency resources) in which the UE is to monitor PDCCH candidates is defined as a PDCCH (monitoring) occasion. One or more PDCCH (monitoring) occasions may be configured in a slot.

Table 3 shows the characteristics of each SS.

TABLE 3

| Type | Search Space | RNTI | Use Case |
|---|---|---|---|
| Type0-PDCCH | Common | SI-RNTI on a primary cell | SIB Decoding |
| Type0A-PDCCH | Common | SI-RNTI on a primary cell | SIB Decoding |
| Type1-PDCCH | Common | RA-RNTI or TC-RNTI on a primary cell | Msg2, Msg4 decoding in RACH |
| Type2-PDCCH | Common | P-RNTI on a primary cell | Paging Decoding |
| Type3-PDCCH | Common | INT-RNTI, SFI-RNTI, TPC-PUSCH-RNTI, TPC-PUCCH-RNTI, TPC-SRS-RNTI, C-RNTI, MCS-C-RNTI, or CS-RNTI(s) | |
| | UE Specific | C-RNTI, or MCS-C-RNTI, or CS-RNTI(s) | User specific PDSCH decoding |

Table 4 shows DCI formats transmitted on the PDCCH.

TABLE 4

| DCI format | Usage |
|---|---|
| 0_0 | Scheduling of PUSCH in one cell |
| 0_1 | Scheduling of PUSCH in one cell |
| 1_0 | Scheduling of PDSCH in one cell |
| 1_1 | Scheduling of PDSCH in one cell |
| 2_0 | Notifying a group of UEs of the slot format |
| 2_1 | Notifying a group of UEs of the PRB(s) and OFDM symbol(s) where UE may assume no transmission is intended for the UE |
| 2_2 | Transmission of TPC commands for PUCCH and PUSCH |
| 2_3 | Transmission of a group of TPC commands for SRS transmissions by one or more UEs |

DCI format 0_0 may be used to schedule a TB-based (or TB-level) PUSCH, and DCI format 0_1 may be used to schedule a TB-based (or TB-level) PUSCH or a code block group (CBG)-based (or CBG-level) PUSCH. DCI format 1_0 may be used to schedule a TB-based (or TB-level) PDSCH, and DCI format 1_1 may be used to schedule a TB-based (or TB-level) PDSCH or a CBG-based (or CBG-level) PDSCH (DL grant DCI). DCI format 0_0/0_1 may be referred to as UL grant DCI or UL scheduling information, and DCI format 1_0/1_1 may be referred to as DL grant DCI or DL scheduling information. DCI format 2_0 is used to deliver dynamic slot format information (e.g., a dynamic slot format indicator (SFI)) to a UE, and DCI format 2_1 is used to deliver DL pre-emption information to a UE. DCI format 2_0 and/or DCI format 2_1 may be delivered to a corresponding group of UEs on a group common PDCCH which is a PDCCH directed to a group of UEs.

DCI format 0_0 and DCI format 1_0 may be referred to as fallback DCI formats, whereas DCI format 0_1 and DCI format 1_1 may be referred to as non-fallback DCI formats. In the fallback DCI formats, a DCI size/field configuration is maintained to be the same irrespective of a UE configuration. In contrast, the DCI size/field configuration varies depending on a UE configuration in the non-fallback DCI formats.

A CCE-to-REG mapping type is set to one of an interleaved type and a non-interleaved type.

Non-interleaved CCE-to-REG mapping (or localized CCE-to-REG mapping) (FIG. 5): 6 REGs for a given CCE are grouped into one REG bundle, and all of the REGs for the given CCE are contiguous. One REG bundle corresponds to one CCE.

Figure 6:
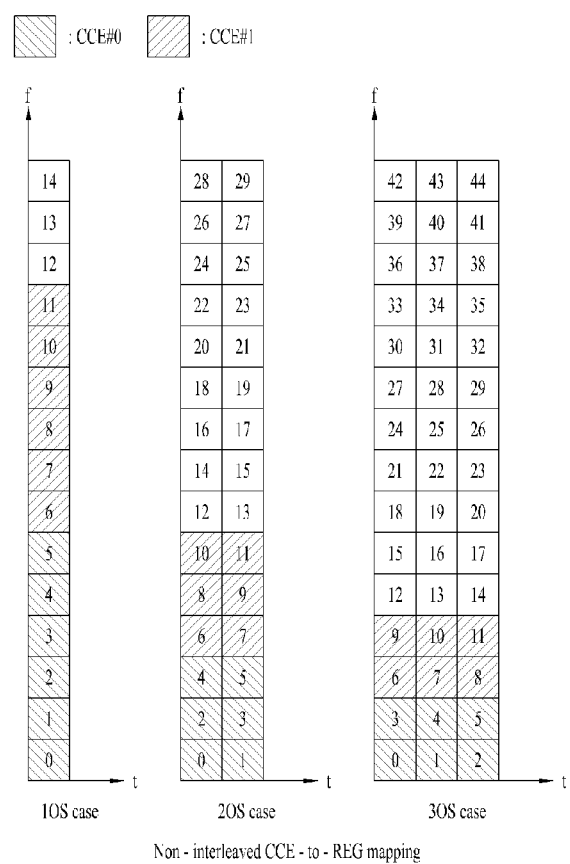
FIGS. 6 and 7 illustrate exemplary control resource set (CORESET) structures.
Figure 7:
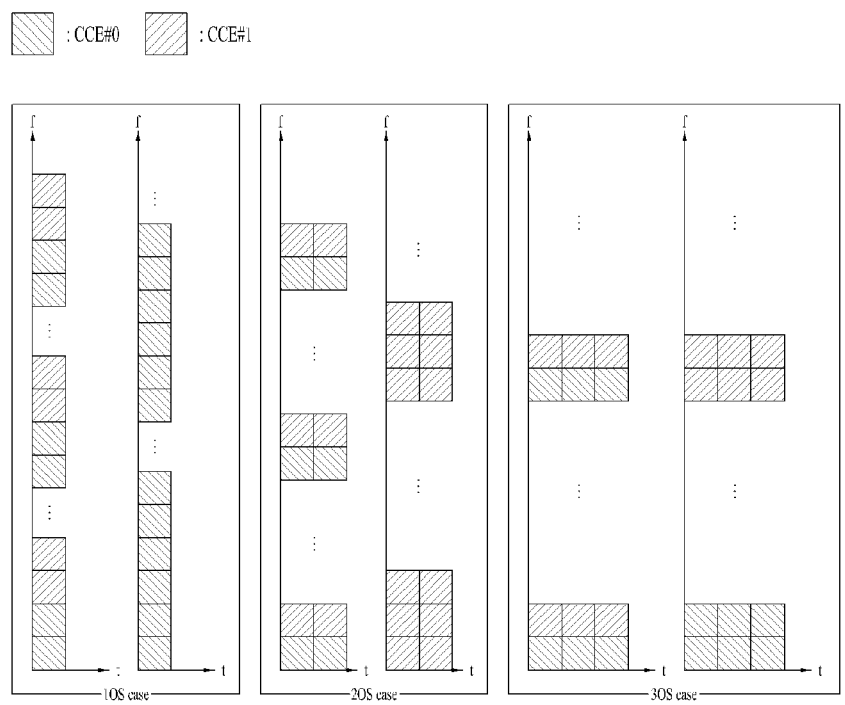

Interleaved CCE-to-REG mapping (or distributed CCE-to-REG mapping) (FIG. 6): 2, 3 or 6 REGs for a given CCE are grouped into one REG bundle, and the REG bundle is interleaved within a CORESET. In a CORESET including one or two OFDM symbols, an REG bundle includes 2 or 6 REGs, and in a CORESET including three OFDM symbols, an REG bundle includes 3 or 6 REGs. An REG bundle size is configured on a CORESET basis.

Equation 1 represents the resources constituting an SS. Specifically, for SS set s associated with CORESET p, CCE indexes for aggregation level L corresponding to PDCCH candidate $m_{s,nCI}$ of the SS in slot $n^{\mu}_{s,f}$ of the active DL BWP of the serving cell (the value of the CI field, $n_{CI}$) may be given as follows.

$$L \cdot \left\{ \left( Y_{p,n^{\mu}_{s,f}} + \left\lfloor \frac{m_{s,n_{CI}} \cdot N_{CCE,p}}{L \cdot M^{(L)}_{s,max}} \right\rfloor + n_{CI} \right) \bmod \lfloor N_{CCE,p}/L \rfloor \right\} + i, \quad \text{[Equation 1]}$$

where:
For the CSS, $Y_{p,n_{s,f}^{\mu}}=0$;
For the USS, $Y_{p,n_{s,f}^{\mu}}=(A_p \cdot Y_{p,n_{s,f}^{\mu}-1}) \bmod D$, $Y_{p,-1}=n_{RNTI} \neq 0$, $A_p=39827$ for p mod 3=0, $A_p=39829$ for p mod 3=1, $A_p=39839$ for p mod 3=2, and D=65537;
i=0, . . . , L−1;
$N_{CCE,p}$ denotes the number of CCEs in CORESET p (0~$N_{CCE,P-1}$);
$n_{CI}$ indicates the CI value of a scheduled cell, and $n_{CI}$=0 when the PDCCH candidate in the CSS includes the CI field;
$M_{s,nCI}$=0, . . . , $M^{(L)}_{s,nCI}$−1, where $M^{(L)}_{s,nCI}$−1 denotes the number of PDCCH candidates configured to be monitored by the UE for aggregation level L in SS set s for the serving cell corresponding to $n_{CI}$;
For the CSS, $M^{(L)}_{s,max}=M^{(L)}_{s,0}$;
For the USS, $M^{(L)}_{s,max}$ denotes the maximum value of $M^{(L)}_{s,nCI}$ for all values of $n_{CI}$ configured for aggregation level L in SS set s,
RNTI indicates C-RNTI.

NR may support a wider uplink/downlink bandwidth by aggregating multiple uplink/downlink carriers (i.e., carrier aggregation). A signal may be transmitted/received on multiple carriers by carrier aggregation. When carrier aggregation is applied, each of the carriers (refer to FIG. 3) may be referred to as a component carrier (CC). CCs may or may not be contiguous in the frequency domain. The bandwidth of each CC may be independently determined. In asymmetric carrier aggregation, the number of UL CCs may be different from the number of DL CCs. In NR, radio resources are divided into/managed as cells. A cell may consist of one DL CC and 0 to 2 UL CCs. For example, a cell may consist of (i) only one DL CC, (ii) one DC CC and one UL CC, or (ii) one DL CC and two UL CCs (including one supplementary UL CC). Cells are divided as follows. In the present disclosure, a cell may be interpreted according to a context, and may represent, for example, a serving cell. Unless otherwise stated, the operations of the present disclosure may be applied to each serving cell.

Primary Cell (PCell): A cell operating at a primary frequency (e.g., primary component carrier (PCC)) at which a UE for which carrier aggregation is configured performs an initial connection establishment procedure or initiates a connection re-establishment procedure. In the case of dual connectivity (DC), a master cell group (MCG) cell operating at a primary frequency at which the UE performs an initial connection establishment procedure or initiates a connection re-establishment procedure.

Secondary Cell (SCell): A cell that provides additional radio resources, other than a special cell for a UE for which carrier aggregation is configured.

Primary SCG Cell (PSCell): A secondary cell group (SCG) cell in which the UE performs random access when performing an RRC reconfiguration and synchronization procedure in the case of DC.

Special Cell (SpCell): In the case of DC, the SpCell represents the PCell of the MCG or the PSCell of the SCG. In the other case (i.e., the case of non-DC), the special cell represents a PCell.

Serving Cell (ServCell): Represents a cell configured for a UE in an RRC_CONNECTED state. When CA/DC is not configured, only one serving cell (i.e., PCell) exists. When CA/DC is configured, the serving cell represents a cell set including the SpCell(s) and all SCells.

The control information may be configured to be transmitted/received only through an SpCell. For example, UCI may be transmitted only through a SpCell (e.g., PCell). When an SCell in which PUCCH transmission is allowed (hereinafter, PUCCH-SCell) is configured, UCI may be transmitted even through the PUCCH-SCell. As another example, the BS may allocate a scheduling cell (set) to lower the complexity of the PDCCH blinding decoding (BD) at the UE side. For PDSCH reception/PUSCH transmission, the UE may perform PDCCH detection/decoding only in the scheduling cell. In addition, the BS may transmit the PDCCH only through the scheduling cell (set). For example, data (e.g., PDSCH, PUSCH) transmitted in one cell (or, active BWP within a cell) (hereinafter, a cell may be replaced with a (active) BWP within the cell) may be scheduled through a PDCCH in the cell (Self-Carrier Scheduling (SCS)). In addition, the PDCCH for downlink allocation may be transmitted in cell #0 (i.e., a scheduling cell), and the corresponding PDSCH may be transmitted in cell #2 (i.e., a scheduled cell) (Cross-Carrier Scheduling (CCS)). The scheduling cell (set) may be configured in a UE-specific, UE-group-specific or cell-specific manner. The scheduling cell includes a special cell (e.g., PCell).

For CCS, a carrier indicator field (CIF) is used. The CIF may be disabled/enabled semi-statically by UE-specific (or UE group-specific) higher-layer signaling (e.g., RRC signaling). The CIF is an x-bit field (e.g., x=3) in the PDCCH (i.e., DCI) and may be used to indicate the (serving) cell index of the scheduled cell.

CIF disabled: The CIF is not present in the PDCCH. The PDCCH in the scheduling cell allocates PDSCH/PUSCH resources in the same cell. That is, the scheduling cell is identical to the scheduled cell.

CIF enabled: The CIF is present in the PDCCH. The PDCCH in the scheduling cell may allocate PDSCH/PUSCH resources in one of a plurality of cells using the CIF. The scheduling cell may be identical to or different from the scheduled cell. A PDSCH/PUSCH means a PDSCH or a PUSCH.

Figure 8:
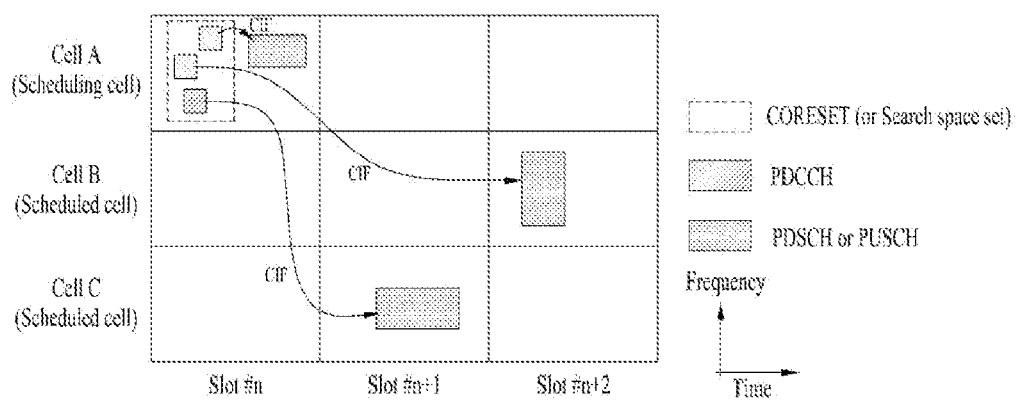
FIG. 8 illustrates a scheduling method in a multi-carrier situation.

FIG. 8 illustrates exemplary scheduling in the case of multi-cell aggregation. Referring to FIG. 8, it is assumed that three cells are aggregated. When the CIF is disabled, only a PDCCH that schedules a PDSCH/PUSCH for each cell may be transmitted in each cell (SCS). On the other hand, when the CIF is enabled by UE-specific (or UE group-specific or cell-specific) higher-layer signaling, and cell A is configured as a scheduling cell, a PDCCH that schedules a PDSCH/PUSCH in another cell (i.e., a scheduled cell) as well as a PDCCH that schedules a PDSCH/PUSCH for cell A may be transmitted in cell A (CCS). In this case, no PDCCH that schedules a PDSCH/PUSCH for cell B/C is transmitted in cell B/C.

Figure 9:
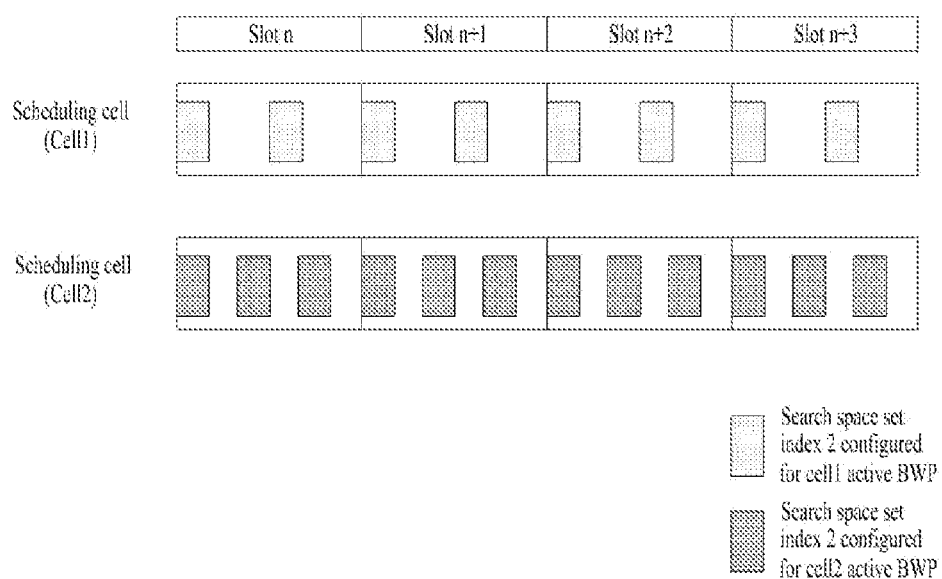

FIG. 9 illustrates a CCS configuration method in an NR system. Referring to FIG. 9, PDCCH monitoring corresponding to an SS set configured for a scheduled cell is performed on a PDCCH monitoring occasion linked to an SS set having the same index as the configured SS set in the scheduling cell. The PDCCH monitoring occasion (e.g., a time resource for monitoring PDCCH) may be determined based on the SS set configuration information, for example, a PDCCH monitoring periodicity (e.g., a periodicity in units of slots), a PDCCH monitoring offset (e.g., an offset in units of slots), and a PDCCH monitoring pattern in a slot (e.g., the first symbol position of CORESET in the slot). A PDCCH monitoring occasion may be determined for each SS set in CORESET p. Up to 10 SS sets may be associated with one CORESET, and each of the SS sets may be identified by an SS set index. For example, when cell 1 is configured as the scheduling cell for cell 2, monitoring for the DCI format linked to SS set #2 of cell 2 may be performed on the PDCCH monitoring occasion configured in the SS set #2 of cell 1. The number of PDCCH candidates for each AL may be configured through nrofCandidates (or nrofCandidates-SFI) among higher layer configuration parameters for the SS set. The number of PDCCH candidates follows the value set in the SS set (having the same index) in the scheduled cell, not the value set in the SS set in the scheduling cell.

In the 3GPP NR-based system, the BS may configure one or more CORESETs for a UE through RRC signaling. It may configure one or more SS sets and also set the number of PDCCH candidates for each PDCCH AL for each SS set. In the 3GPP NR-based system, the maximum number of PDCCH candidates that the BS may configure for the UE for a predetermined time interval is not fixed. Accordingly, the number of PDCCH candidates increases according to the number of serving cells configured for the UE. When the UE needs to monitor a large number of PDCCH candidates for a predetermined time interval, that is, the number of blind decodings that the UE needs to perform for the predetermined time interval is excessively large, the complexity of PDCCH decoding in the UE and the complexity of HARQ process management increase. Further, the UE capability for PDCCH monitoring for each predetermined time interval depends not only on the maximum number of PDCCH candidates that the UE may monitor for each predetermined time interval, but also on the number of CCEs on which the UE may perform channel estimation for each predetermined time interval. Here, the number of CCEs for which the UE needs to perform channel estimation may mean the number of non-overlapping CCEs. This is because, for overlapping CCEs, the UE may reuse the channel estimation result for one CCE for another CCE. When CCEs for PDCCH candidates correspond to different CORESET indices or have different first symbols, they are non-overlapping CCEs.

Accordingly, in the 3GPP NR-based system, the maximum number of PDCCH candidates monitored by the UE and/or the number of non-overlapping CCEs are set or defined.

Table 5 exemplarily shows the maximum number of monitored PDCCH candidates per slot, $M^{max,slot,u}_{PDCCH}$, for a DL BWP with SCS configuration $u \in \{0,1,2,3\}$ for a single serving cell, Table 6 exemplarily shows the maximum number of non-overlapping CCEs per slot, $C^{max,slot,u}_{PDCCH}$, for a DL BWP with SCS configuration $u \in \{0,1,2,3\}$ for a single serving cell.

TABLE 5

| u | Maximum number of monitored PDCCH candidates per slot and per serving cell $M^{max,slot,u}_{PDCCH}$ |
|---|---|
| 0 | 44 |
| 1 | 36 |
| 2 | 22 |
| 3 | 20 |

TABLE 6

| u | Maximum number of non-overlapped CCEs per slot and per serving cell $C^{max,slot,u}_{PDCCH}$ |
|---|---|
| 0 | 56 |
| 1 | 56 |
| 2 | 48 |
| 3 | 32 |

The UE is configured to have $N^{DL,u}_{cells}$ DL cells with DL BWPs having SCS configuration u, and $\Sigma_{\mu=0}^{3}(N_{cells}^{DL,\mu}) \leq N_{cells}^{cap}$, the UE is not required to monitor more than $M^{total,slot,u}_{PDCCH} = M^{max,slot,u}_{PDCCH}$ PDCCH candidates or more than $C^{total,slot,u}_{PDCCH} = C^{max,slot,u}_{PDCCH}$ non-overlapping CCEs for each slot for each scheduled cell in the active DL BWP of the scheduling cell. Also, when the UE is configured to have $N^{DL,u}_{cells}$ DL cells with DL BWPs having SCS configuration u, $\Sigma_{\mu=0}^{3}(N_{cells}^{DL,\mu}) > N_{cells}^{cap}$, the DL BWP of the activated cell is the active DL BWP of the activated cell, and the DL BWP of the deactivated cell is a DL BWP configured as the first active DL BWP through RRC signaling from the BS for the deactivated cell, the UE is not required to monitor more than $$M_{PDCCH}^{total,slot,\mu} = \left\lfloor N_{cells}^{cap} \cdot M_{PDCCH}^{max,slot,\mu} \cdot N_{cells}^{DL,\mu} \Big/ \sum_{j=0}^{3} N_{cells}^{DL,j} \right\rfloor$$

PDCCH candidates or more than $$C_{PDCCH}^{total,slot,\mu} = \left\lfloor N_{cells}^{cap} \cdot C_{PDCCH}^{max,slot,\mu} \cdot N_{cells}^{DL,\mu} \Big/ \sum_{j=0}^{3} N_{cells}^{DL,j} \right\rfloor$$

non-overlapping CCEs for each slot in the active DL BWP(s) of the scheduling cell(s) from the $N^{DL,\mu}_{cells}$ DL cells. Here, if the UE provides the blind detection capability to the BS, $N^{cap}_{cells}$ may be the value of the blind detection capability. Otherwise, it may be the number of DL cells configured for the UE.

When the UE is capable of supporting the following set, the UE may determine the number of serving cells ($N^{DL,\mu}_{cells}$) as $N^{DL}_{cells,0} + R*N^{DL}_{cells,1}$ in order to provide the BS with a blind detection capability. R may be determined according to the UE capability and may be 1 or 2. $N^{cap}_{cells}$ may be the value of the blind detection capability fi the UE provides the blind detection capability to the BS. Otherwise, it may be determined as $N^{DL}_{cells,0} + R*N^{DL}_{cells,1}$.

A first serving cell set in which CORESETPoolIndex is not provided, or a single value of CORESETPoolIndex is provided for all CORESETs in all DL BWPs of each scheduling cell (wherein the number of serving cells is $N^{DL}_{cells,0}$);

A second serving cell set in which CORESETPoolIndex is not provided, or different CORESETPoolIndex is provided for CORESETs in any DL BWP of each scheduling cell (wherein the number of serving cells is $N^{DL}_{cells,1}$).

CORESET Pool Index: Indicates the mapping between the activated transmission configuration indicator (TCI) and DCI transmission configuration.

For each scheduled cell, the UE is not required to monitor more than $\min(M^{max,slot,\mu}_{PDCCH}, M^{total,slot,\mu}_{PDCCH})$ PDCCH candidates or more than $\min(C^{max,slot,\mu}_{PDCCH}, C^{total,slot,\mu}_{PDCCH})$ non-overlapping CCEs for each slot in the active DL BWP with the SCS configuration u of the scheduling cell.

For all SS sets in slot n, $S_{css}$ denotes the set of CSS sets with cardinality of $I_{css}$, and $S_{uss}$ denotes the set of USS sets with cardinality of $J_{uss}$. The positions of the USS sets Sj in $S_{uss}$ follows the ascending order of the SS set index, $0<=j<J_{uss}$. $M^{(L)}_{Scss(i)}$, $0<=i<I_{css}$ denotes the number of PDCCH candidates counted for monitoring for the CSS set $S_{css}(i)$, $M^{(L)}_{Suss(j)}$, $0<=j<J_{uss}$ denotes the number of PDCCH candidates counted for monitoring for the USS set $S_{uss}(j)$. For CSS sets, the UE monitors PDCCH candidates that require a total of $C^{CSS}_{PDCCH}$ non-overlapping CCEs in the slot. PDCCH candidates to be monitored by the UE may be allocated to USS sets for a PCell having an active DL BWP that is an SCS configuration u in slot n according to the pseudocode shown in Table 7. In a USS set to which no PDCCH candidates to be monitored are allocated, the UE does not expect to monitor the PDCCH. $V_{CCE}(S_{uss}(j))$ denotes the set of non-overlapping CCEs for the SS set $S_{uss}(j)$, and $C(V_{CCE}(S_{uss}(j)))$ denotes the cardinality of $V_{CCE}(S_{uss}(j))$. Here, the non-overlapping CCEs for the SS set $S_{uss}(j)$ are determined, considering the number of PDCCH candidates allocated for monitoring for the CSS sets and the PDCCH candidates allocated for monitoring for all the SS sets $S_{uss}(k)$ ($0<=k<=j$).

TABLE 7

Set $M_{PDCCH}^{uss} = \min(M_{PDCCH}^{maxslot,\mu}, M_{PDCCH}^{totalslot,\mu}) - M_{PDCCH}^{css}$
Set $C_{PDCCH}^{uss} = \min(C_{PDCCH}^{maxslot,\mu}, C_{PDCCH}^{totalslot,\mu}) - C_{PDCCH}^{css}$
Set j = 0
while $\sum_L M^{(L)}_{S_{uss}(j)} \leq M^{uss}_{PDCCH}$ AND $C(V_{CCE}(S_{uss}(j))) \leq C_{PDCCH}^{uss}$ allocate $\sum_L M^{(L)}_{S_{uss}(j)}$ PDCCH candidates for monitoring to USS set $S_{uss}(j)$ $M^{uss}_{PDCCH} = M^{uss}_{PDCCH} - \sum_L M^{(L)}_{S_{uss}(j)}$;

$C_{PDCCH}^{uss} = C_{PDCCH}^{uss} - C(V_{CCE}(S_{uss}(j)))$;
j = j + 1 ;
end while URLLC, which is one of the representative scenarios of the next system, has low-latency, high-reliability requirements of a user-plane latency of 0.5 ms and an error rate of 10^−5 within which to X bytes of data should be transmitted within 1 ms. When it is necessary to process a URLLC service or traffic that must satisfy the low latency requirement, more frequent scheduling using a channel having a shorter duration may be required. In this case, there may be more monitoring occasions in the slot. For example, the BS may need to configure more and more monitoring occasions (for the same SS set or different SS sets) in one slot. In some scenarios, a set of consecutive symbols may be formed in the slot for the UE to monitor PDCCH candidates. The set of consecutive symbols configured in the slot for the UE to monitor PDCCH candidates is referred to as a span or a monitoring span. Spans do not overlap with each other, and each span is contained in a single slot. The same span pattern may be repeated in every slot. Each monitoring period is fully contained within one span. The UE may report one or more combinations of (X, Y) symbols for PDCCH monitoring. Here, X denotes the minimum time separation between the starts of two consecutive spans, and Y denotes the maximum number of consecutive OFDM symbols that each span may occupy in a slot. For example, in a situation in which the UE has reported a combination of (X, Y) symbols for PDCCH monitoring, when a span starts at symbol #i in the slot, the next span may start at symbol #i+X at the earliest. The duration of the span is $d_{span}$=max $(d_{CORESET,max}, Y_{min})$, where $d_{CORESET,max}$ is the maximum duration among the durations of CORESETs configured for the UE and $Y_{min}$ is the minimum value of Y in the combinations of (X, Y) reported by the UE. In a situation where multiple monitoring occasions are configured and/or multiple monitoring spans are formed in one slot, limitation of the maximum number of monitored PDCCH candidates per slot and/or the maximum number of non-overlapping CCEs per slot, shown in Tables 5 and 6, may be insufficient to prevent the maximum number from exceeding the UE capability.

Tables given below show the maximum number of PDCCH candidates per span and the maximum number of non-overlapping CCEs per span. In particular, Table 8 exemplarily shows $M^{max,(X,Y),\mu}_{PDCCH}$, the maximum number of monitored PDCCH candidates per span for a combination (X, Y) for the DL BWP with the SCS configuration u∈{0,1} for a single serving cell, and Table 9 exemplarily shows $C^{max,(X, Y),u}_{PDCCH}$, the maximum number of non-overlapping CCEs per span for a combination (X, Y) for the DL BWP with the SCS configuration u∈{0,1} for a single serving cell.

TABLE 8

Maximum number $M^{max,(X, Y),u}_{PDCCH}$ of non-overlapped CCEs per span for combination (X, Y) and per serving cell

| u | (2, 2) | (4, 3) | (7, 3) |
|---|--------|--------|--------|
| 0 | 14 | 28 | 44 |
| 1 | 12 | 24 | 36 |

TABLE 9

Maximum number $M^{max,(X, Y),u}_{PDCCH}$ of monitored PDCCH candidates per span for combination (X, Y) and per serving cell

| u | (2, 2) | (4, 3) | (7, 3) |
|---|--------|--------|--------|
| 0 | 18 | 36 | 56 |
| 1 | 18 | 36 | 56 |

Referring to Tables 8 and 9, the UE may indicate one or more of the combinations (X, Y)=(2, 2), (4, 3) and (7, 3) per SCS configuration of u=0 and u=1 as the capability of monitoring the PDCCH. The BS may provide a PDCCH configuration to the UE based on the capability reported by the UE. The UE may determine spans formed therein based on the PDCCH configuration. For example, when SS sets are configured in a slot in a serving cell with SCS configuration u=0 (or DL BWP with SCS configuration u=0), the UE may determine that spans corresponding to a combination (4, 3) are formed in the slot. In this case, the UE may perform PDCCH monitoring based on the values of $M^{max,(X,Y),u}_{PDCCH}$ and $C^{max,(X,Y),u}_{PDCCH}$ defined for the SCS configuration u=0 and the combination (4, 3).

In the case where the monitoring occasion(s) is configured to exceed the UE capability, a rule may be defined such that the UE skips (that is, omits or drops) monitoring of the monitoring occasions/candidates/AL (set) of low priority according to the predefined priorities (or the UE does not expect a configuration exceeding the capability thereof). For example, when monitoring occasions exceeding the UE capability are configured, the UE may allocate PDCCH candidates for monitoring to the monitoring span/SS/occasion/candidate/AL (set) of the highest priority (or priorities) according to predefined priorities within a range not exceeding the maximum number of PDCCH candidates and/or the maximum number of non-overlapping CCEs per slot.

Embodiment: CCS from SCell to PCell

For smooth immigration to a 5G NR service, a scenario of enabling the 5G NR service of a BS for which the existing LTE service is provided, only by software upgrade may be considered. In this case, the BS may serve both the LTE and NR systems in a specific band. Also, in the specific band, the existing LTE UE may receive the LTE service and the 5G NR UE may receive the NR service. For example, the BS may have carrier #1 (e.g., 1.8 GHz) at which the LTE and NR systems coexist/operate and carrier #2 (e.g., 3.5 GHz) at which only the NR system is operated, and an NR UE communicating with the BS may make an access through carrier #1 and carrier #2 at the same time. In this case, carrier #1 may be configured as a PCell in consideration of the wide coverage, which is a characteristic of low frequencies. However, at carrier #1, the BS may need to serve even LTE. Here, serving LTE means that an always-on signal such as a cell-specific reference signal (CRS) may be transmitted, and PDCCH transmission may be reserved in the front of every subframe. When NR is served under these conditions, the space for PDCCH transmission through carrier #1 may be insufficient. In order to overcome this drawback, scheduling DCI for DL/UL data (e.g., PDSCH/PUSCH) to be transmitted in the PCell may be transmitted in an SCell. That is, by transmitting, in the SCell, DCI for scheduling DL/UL data to be transmitted in the PCell, PDCCH transmission may be offloaded from the PCell to the SCell. In other words, cross-carrier scheduling (CCS) may be configured, such that the scheduling cell may be configured as the SCell, and the scheduled cell may be configured as the PCell.

Hereinafter, the present disclosure proposes a method of configuring and supporting SCell-to-PCell CCS. In the present disclosure, the PCell may be equally applied to the PSCell in the SCG. That is, even when a PDSCH or a PUSCH to be transmitted in a PSCell is scheduled through DCI transmitted in an SCell belonging to the SCG, the proposed method may be equally applied. Therefore, the proposed method may be generalized to be applied to a special cell (SpCell).

Abbreviations/terms used in the present disclosure are summarized below for description of the proposed method.
  Cell: May be interpreted according to context, and represent, for example, a serving cell. A cell may consist of one DL CC and 0 to 2 UL CCs. For example, a cell may consist of one DL CC and one UL CC. A cell may be substituted with an active BWP in the cell.
  First, the expressions employed in the present disclosure are summarized below.
  Scheduling DCI for cell #A: DCI including scheduling information about PDSCH reception or PUSCH transmission in cell #A (e.g., DCI 0_X, 1_X; X=0 to 2).
  Receiving CCS for cell #A: Detecting/receiving scheduling DCI in the scheduling cell for cell #A to detect/receive scheduling information for cell #A. For example, receiving CCS for the PCell in the SCell may mean detecting/receiving scheduling DCI in the scheduling SCell for the PCell in order to detect/receive scheduling information for the PCell.
  Receiving SCS for cell #A: Detecting/receiving scheduling DCI in cell #A to detect/receive scheduling information for cell #A.
  DCI reception: Includes an operation of monitoring (e.g., blind decoding) a plurality of PDCCH candidates in order to receive DCI.
  A cell may be substituted with an active BWP in the cell.
  A PCell/(scheduling) SCell may be generalized to a scheduled cell/scheduling cell. Also, PCell may be substituted with SpCell.
  CCS from cell X to cell Y (or cell X to cell Y CCS): cross-carrier scheduling in which cell X is a scheduling cell and cell Y is a scheduled cell
  SCS from cell X to cell X (or cell X to cell X SCS): Self-carrier scheduling in which cell X is a scheduled/scheduled cell Self-carrier scheduling (SCS) and subcarrier Spacing (SCS) are distinguished according to context. For simplicity, SCS may be represented as SCS_u.

Cell X SS set: Represents an SS set configured in cell X.

1) Receiver (Entity A (e.g., UE)):

[Method #1] Configuration of Cross-Carrier Scheduling (CCS) May be Received for a Specific SS Set Configured in the PCell (or the Scheduled Cell).

CCS may be configured for a USS set configured in the PCell. That is, CCS may be configured for SS sets except for the CSS set. For example, the CCS may be configured only for a USS set configured in the PCell linked to a specific DCI format (e.g., DCI format 0_1/1_1 and/or DCI format 0_2/1_2). Accordingly, SCS may still be performed on the PCell in an SS set (e.g., a CSS set) for which CCS is not configured among the SS sets configured in the PCell. Here, the DCI format 0_2/1_2 may minimize the DCI payload size to ensure ultra-reliability. Alternatively, when CCS is configured, the CCS may be configured only for a USS set configured in the PCell, linked to the DCI format in which the carrier indicator (CI) field is configured to be larger than the 0 bit bit-width. Alternatively, an index of an SS set to which CCS is to be applied among the SS set indices that satisfy a specific condition may be configured by higher layer (e.g., RRC) signaling. Here, the SS set index satisfying the specific condition includes, for example, a USS set, a USS set linked to DCI format 0_1/0_2/1_1/1_2, or a USS set linked to a DCI format having the CI field.

As an example, CSS set index 0/1 and USS (w/DCI format 0_1/1_1) set index 2/3 may be configured in the PCell, and USS set index 0/1/2/3 may be configured in the SCell. In this case, when the SCell is set as the scheduling cell of the PCell, the UE may receive scheduling DCI for the PCell in only USS set index 2/3 in the SCell, which has the same index as USS set index 2/3 linked to the DCI format 0_1/1_1 of the PCell. In this case, in the remaining SS sets in the PCell, that is, CSS set indexes 0/1, the UE may receive scheduling DCI for the PCell. As another example, CCS may be configured (by higher layer signaling configuration) for only USS set index 2 between USS set indexes 2/3 linked to DCI format 0_1/1_1 of the PCell. In this case, the UE may receive scheduling DCI for the PCell in only USS set index 2 in the SCell (CCS), and may receive scheduling DCI for the PCell in USS set index 3 in the PCell (SCS). In the remaining SS sets of the PCell, that is, CSS set indexes 0/1, the UE may receive scheduling DCI for the PCell.

Alternatively, when there is an SS set of the SCell having the same index as a specific SS set index of the PCell, the UE may perform monitoring in the SS sets of both cells even if CCS is configured. In this case, the monitoring occasion may conform to an SS set configuration established in each cell. In addition, the number of PDCCH candidates per AL may be determined as follows (wherein the PDCCH candidates refer to PDCCH candidates corresponding to DCI for scheduling a PDSCH or PUSCH to be transmitted in the PCell, that is, DCI having a value of CI corresponding to the PCell):

OPT1) The SS set configuration established in each cell may be applied;

OPT2) The number of PDCCH candidates in the SS set configuration established in the PCell may be applied to both the PCell and the SCell; or OPT3) A part of the number of PDCCH candidates in the SS set configuration established in the PCell may be applied to the PCell, and the other part may be applied to the SCell.

For example, when the scheduling cell for the PCell is configured as an SCell, SS set index 2 of the PCell and SS set index 2 of the SCell may be linked. When the number of PDCCH candidates at AL=X (where X is a positive integer, e.g., 1) in SS set index 2 of the PCell is set to N1, and the number of PDCCH candidates at AL=X in SS set index 2 of the SCell is set to N2, DCI for scheduling a PDSCH or PUSCH to be transmitted in the PCell may be monitored as follows, wherein N1 and N2 denote positive integers:

OPT1: Performing PDCCH blind detection N1 times for AL=1 on a monitoring occasion corresponding to SS set index 2 in the PCell, and N2 times for AL=1 on a monitoring occasion corresponding to SS set index 2 in the SCell;

OPT2: Performing PDCCH blind detection N1 times for AL=1 on a monitoring occasion corresponding to SS set index 2 in the PCell, and N1 times for AL=1 on a monitoring occasion corresponding to SS set index 2 in the SCell;

OPT3: Performing PDCCH blind detection floor or ceiling (N1*R) times for AL=1 on a monitoring occasion corresponding to SS set index 2 in the PCell, {N1−floor or ceiling (N1*R)} times for AL=1 on a monitoring occasion corresponding to SS set index 2 in the SCell. Here, R may be predefined (e.g., R=0.5) or set by the BS, and may be a real number greater than or equal to 0 and less than or equal to 1. Here, floor represents a rounding-down function, and ceiling represents a rounding-up function.

When PDCCH monitoring is performed for an SS set in the SCell having the same index as a specific SS set index configured in the PCell, there may be no corresponding SS set configuration in the SCell. For example, CSS set index 0/1 and USS (w/DCI format 0_1/1_1) set index 2/3 may be configured in the PCell, and USS set index 0/1/2 may be configured in the SCell. In this case, when the SCell is configured as the scheduling cell for the PCell, the UE may perform scheduling DCI reception for the PCell in USS set index 2 in the SCell, which has the same index as SS set index 2 linked to DCI format 0_1/1_1 of the PCell. On the other hand, when there is no SS set configuration of the SCell corresponding to SS set index 3 of the PCell, corresponding PDCCH monitoring (i.e., PDCCH monitoring corresponding to 3, which is the SS set index of the PCell in the SCell) may be skipped. As a result, the transmission region for scheduling DCI for the PDSCH or PUSCH to be transmitted in the PCell may be reduced.

As a method to address this issue, it may be configured/defined to perform PDCCH monitoring by inheriting the configuration of a specific SS set index in the SCell. For example, as in the example above, when there is no SS set configuration of the SCell corresponding to the SS set index 3 of the PCell, the UE may perform DCI reception as many times as the number of PDCCH candidates set in SS set index 3 of the PCell, on a monitoring occasion which is configured in a specific SS set index (e.g., the smallest or largest index) of the SCell (or where the monitoring occasion related parameters configured in SS set index 3 of the PCell are applied to the SCell).

Alternatively, in configuring the CCS, a link relationship may be established between a specific SS set index of the PCell and a corresponding SS set index of the SCell. As an example, CSS set index 0/1 and USS (w/DCI format 0_1/1_1) set index 2/3 may be configured in the PCell, and USS set index 0/1/2 may be configured in the SCell. In this case, when the SCell is configured as the scheduling cell of the PCell, a link relationship may be established between SS set index 2/3, which is linked to DCI format 0_1/1_1 of the PCell, and the USS set index 2 in the SCell. Accordingly, the UE may receive scheduling DCI for the PCell in USS set index 2 in the SCell. For example, in USS set index 2 in the SCell, the UE may receive DCI as many times as the number of PDCCH candidates corresponding to the sum of the numbers of PDCCH candidates configured in SS set index 2/3 of the PCell.

[Method #2] an SS Set Drop Rule According to Overbooking of the Maximum Number of PDCCH Candidates and CCEs when CCS Having the PCell as a Scheduled Cell is Configured In consideration of the UE implementation complexity, the NR system defines the maximum number of PDCCH candidates and the maximum number of non-overlapping CCEs that the UE should monitor per cell (or BWP) and per slot as shown in Tables 5 and 6, and allows only PDCCH monitoring within a corresponding constraint.

In the case of a specific cell (e.g., PCell), an SS set may be allowed to be configured such that the number of PDCCH candidates and the number of non-overlapping CCEs in the slot exceed the maximum number of PDCCH candidates and the maximum number of non-overlapping CCEs defined per cell (or BWP) or per slot. Considering that the periodicity/offset/duration may differ among SS sets, the number of PDCCH candidates and the number of non-overlapping CCEs in a slot may be set not to exceed the constraint (i.e., the maximum number of PDCCH candidates and the maximum number of non-overlapping CCEs) in other slots even if they exceed the constraint in a specific slot. For example, considering that there is an SS set for which PDCCH monitoring should be guaranteed with a specific periodicity, such as a CSS set in the PCell, the number of remaining PDCCH candidates and the number of non-overlapping CCEs may differ among slots. Also, considering flexibility of configuration of the BS based on the aforementioned difference, it may be necessary to allow the numbers to exceed the constraint in a specific slot. In this case, when the constraint on the maximum number of PDCCH candidates and the maximum number of non-overlapping CCEs in the slot is exceeded, the constraint may be satisfied for all slots by deactivating (or dropping) some of the SS sets configured in the slot. To this end, as described with reference to Table 7, an SS set to be dropped in the slot or an SS set for which PDCCH monitoring will not be performed may be determined.

Therefore, based on that CCS having the PCell as a scheduled cell is configured, when the SS set drop rule is applied (see Table 7) as a number greater than the maximum number of PDCCH candidates and/or CCEs is set in a slot, the number of PDCCH candidates and/or CCEs in the slot for the USS set(s) in the SCell having the same index as specific USS set(s) should be considered. Here, the specific USS set may be determined by Method #1.

FIG. 10 illustrates an SS set drop rule applied when SCS is configured for the PCell. Referring to FIG. 10, for the PCell, CSS set index 0 (in which the number of PDCCH candidates is set to 30) and USS set index 1/2 (in which the number of PDCCH candidates is set to 10 and 8, respectively) may be configured. For the SCell, USS set index 1/2 (in which the number of PDCCH candidates is set to 12 and 5, respectively) may be configured. Assuming that the maximum number of PDCCH candidates that the UE may monitor per cell and per slot is 44, the SS set drop rule may be applied because the preset number of PDCCH candidates for slot #n of the PCell is 48 (=30+10+8). Accordingly, PCell USS set index 2 may be dropped in slot #n. Accordingly, the number of PDCCH candidates that the UE actually monitors in slot #n of the PCell is 40 (=30+10).

Figure 11:
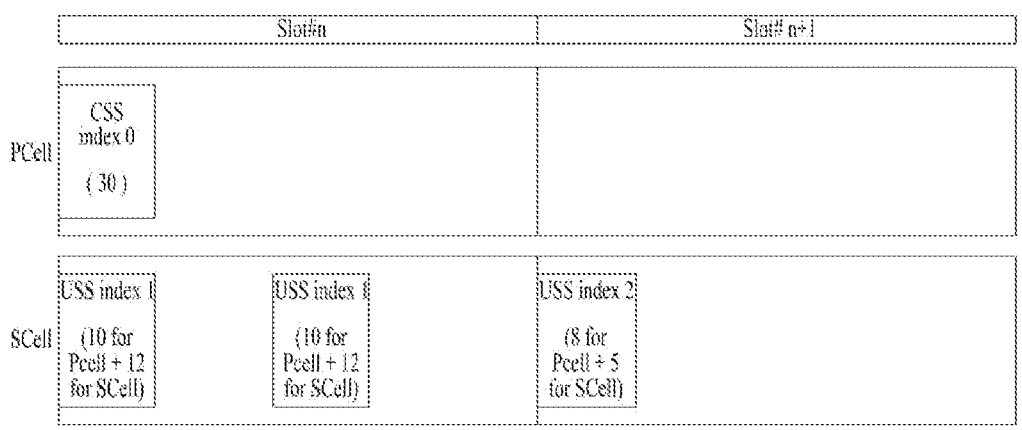

FIG. 11 illustrates an SS set drop rule applied when CCS is configured for the PCell. The SS set configuration in the PCell/SCell is the same as that of FIG. 10. Referring to FIG. 11, when the scheduling cell for the PCell is configured as the SCell, for the PCell, monitoring of CSS set index 0 may be still performed in the PCell, but monitoring of USS set index 1/2 may be performed in the SCell. In this case, the UE may monitor USS set index 1 (in which 22 PDCCH candidates are configured in total, among which 10 candidates are configured for the PCell and the remaining 12 candidates are set for the SCell) for the SCell in slot #n. In this case, in applying the SS set drop rule to slot #n for the PCell, CSS set index 0 for monitoring in the PCell and USS set index 1 for monitoring in the SCell (for PCell) should be considered, unlike in the case of FIG. 10. In this case, since the total number of PDCCH candidates for the PCell is 50 (=30+10+10), the UE may drop USS set index 1, and monitor only 44 or fewer (i.e., 30) PDCCH candidates for PCell, wherein 44 is the maximum allowed number. However, a total of 24 (=12+12) PDCCH candidates for the SCell configured in SCell USS set index 1 in slot #n may continue to be monitored.

Even if CCS is configured for the PCell as in Method #1 (e.g., OPT1/2/3), some USS sets may still be configured such that monitoring will continue to be performed in the PCell (and the SCell). In this case, in applying the SS set drop rule to slot #n, not only the number of PDCCH candidates and/or CCEs configured in the PCell USS set, but also the number of PDCCH candidates and/or CCEs configured in the SCell USS set having the same index as the PCell USS set should be considered. Here, the number of PDCCH candidates and/or CCEs configured in the SCell USS set having the same index as the PCell USS set means the number of PDCCH candidates and/or CCEs corresponding to DCI for scheduling a PDSCH or PUSCH to be transmitted in the PCell.

[Method #3] Method of CCS for the PCell when the Scheduling Cell for the PCell is in a Deactivated (or Dormancy) State When data transmission is not required in a specific cell (e.g., SCell), the cell may be transitioned to the deactivated or dormancy state in order to reduce power consumption of the UE. In the deactivated or dormancy, the UE may not perform at least PDCCH monitoring in the cell. Transition of the cell to the deactivated or dormancy state transition may be configured/indicated through higher layer signaling (e.g., RRC or medium access control (MAC) signaling) or DCI, and/or the UE may be configured to transition to the deactivated or dormancy state when the value of a timer exceeds a certain level (e.g., the timer expires). Here, the deactivated or dormancy state means that at least PDCCH monitoring is not performed in the cell, and may be substituted with other equivalent terms.

When the CCS is configured and there is an SCell configured as a scheduling cell for the PCell, the SCell may be changed to an deactivated or dormancy state. In this case, when PDCCH monitoring in the SCell is all turned off, scheduling DCI transmission resources for the PDSCH or PUSCH to be transmitted in the PCell may become insufficient. To address this issue, the following methods may be used.

Alt 1: When the SCell is changed to the deactivated or dormancy state, the CCS configuration for the PCell may be canceled and the PCell may be automatically switched to self-carrier scheduling (SCS). For example, when the SCell is changed to the deactivated or dormancy state, while the UE receives CCS for the PCell in SCell USS set index 2/3, the UE may receive SCS in PCell USS set index 2/3.

Alt 2: Even when the SCell is changed to the deactivated or dormancy state, the UE operation may be defined to continue receiving the CCS for the PCell in the SCell. For example, while the UE is receiving the CCS for the PCell in SCell USS set index 2/3, the SCell may be changed to the deactivated or dormancy state. In this case, in SCell USS set index 2/3, the UE may receive only the CCS for the PCell and may not perform other PDCCH monitoring (e.g., PDCCH monitoring for the SCell).

Alt 3: Even when CCS is configured for PCell, PDCCH monitoring for scheduling a PCell may be configured for both PCell/SCell. Thereafter, when the SCell is changed to the deactivated or dormancy state, the UE operation may be defined to either turn off all PDCCH monitoring in the SCell or to continue receiving only the CCS for the PCell in the SCell as in the case of Alt 2. As an example, while performing SCS for the PCell in PCell USS set index 2/3, the UE may receive CCS for the PCell in SCell US S set index 2/3. Thereafter, when the SCell is changed to the deactivated or dormancy state, all PDCCH monitoring in the SCell may be turned OFF, or the UE may receive only the CCS for the PCell and may not perform other PDCCH monitoring in SCell USS set index 2/3.

Alt 4: The UE may expect that the SCell configured as the scheduling cell for the PCell will not change to the deactivated or dormancy state. Specifically, the deactivation timer may not be operated for the SCell, or may be separately set to a relatively long time value. In addition, the UE may not expect signaling for configuring/indicating deactivation or dormancy for the SCell.

Similarly, a solution may also be needed when BWP switching is performed in the scheduling SCell. Specifically, when the deactivation timer for the BWP is set, and there is no PDCCH reception during the timer period in the active BWP, the UE may perform switching to a preset specific BWP (e.g., default BWP, initial BWP, etc.). However, the specific BWP may have a relatively small frequency resource or sparse monitoring occasions compared to the active BWP for the purpose of power saving of the UE, and thus the DCI transmission region for scheduling data in the PCell may be small. To address this issue, the BWP deactivation timer may not be operated for the SCell configured as the scheduling cell for the PCell, or the BWP deactivation timer may be separately set to a relatively long time value. Alternatively, when switching to a preset specific BWP (e.g., default BWP, initial BWP, etc.) as the timer expires, the UE may expect that an SS set in which CCS with the PCell is possible will be configured in the BWP. Alternatively, when switching to a preset specific BWP (e.g., default BWP or initial BWP, etc.) as the timer expires, the CCS configuration for the PCell may be canceled (if the BWP has no SS set in which CCS with the PCell is possible), and the PCell may be automatically switched to the SCS.

[Method #4] Reporting a Preferred Scheduling SCell

When there are multiple SCells linked to the PCell from the perspective of the UE, the UE may report preferred SCell(s) (hereinafter, a preferred SCell list) (as a scheduling cell of the PCell). Among the multiple SCells, an SCell expected to have good reception performance may be selected as a scheduling cell for a PDSCH or PUSCH to be transmitted in the PCell. However, when the BS selects/configures a scheduling SCell suitable for PDCCH transmission, it may be difficult to select an appropriate SCell without assistance information from the UE. Accordingly, the BS may select an appropriate scheduling SCell based on the preferred SCell list reported from the UE. For reporting on the preferred SCell list, resources through which reporting is to be periodically performed may be configured for the UE. As an example, information related to the preferred SCell list may be transmitted through (periodic or semi-persistent) PUCCH, may be partially carried in UCI piggybacking on the PUSCH, or may be transmitted through a MAC control element (CE). Alternatively, for preferred SCell reporting, an aperiodic reporting resource may be configured. As an example, the information related to the preferred SCell list may be transmitted through a triggered aperiodic PUCCH, partially carried in UCI piggybacking on the PUSCH, transmitted through a MAC CE, or reported through a preset PRACH preamble resource.

[Method #5] Setting a Value of a Carrier Indicator (CI) for the PCell when CCS is Configured for the PCell When CCS is configured in the NR system, the scheduling cell is defined to take 0 as the CI value when scheduling itself, and take a set CI value when scheduling other cells. In other words, in the case where the SCell is configured as a scheduling cell of the PCell, the CI value may be 0 when the SCell is scheduled, and a set CI value may be used when the PCell is scheduled. On the other hand, in the case where the PCell is configured as a scheduled cell, CI corresponding to the PCell may be predefined as 0 (or 1). When the CI corresponding to the PCell is 0, the CI corresponding to the scheduling SCell may be predefined as 1.

[Method #6] Configuring/Indicating a Scheduling SCell for PCell when CCS is Configured for the PCell As in Method #3, it may be difficult to fully support CCS through the SCell for reasons such as switching of the SCell configured as the scheduling cell for the PCell to the deactivated or dormancy state. In preparation for such a situation, it is necessary to increase the flexibility of configuration of a scheduling SCell in configuring CCS for the PCell. As a method, an indication of the scheduling SCell may be signaled through MAC CE or DCI rather than higher layer (e.g., RRC) signaling. As an example, change (e.g., SCell index or serving cell index) of a scheduling cell may be signaled in DCI information transmitted through a CSS set in the PCell. In preparation for an issue raised when the UE misses the signaling, the UE receiving the signaling may inform the BS of whether it has received the signaling by transmitting a confirmation MAC CE or a corresponding HARQ-ACK. Alternatively, in configuring CCS for the PCell, one or more corresponding (candidate) scheduling SCell(s) may be configured. For priorities of multiple (candidate) scheduling SCells, a rule may be predefined (e.g., the smallest or largest serving cell index is prioritized (among the activated cells)), or priorities may be configured. For example, as candidate scheduling SCells, SCell #1 and SCell #2 may be configured, and SCell #1 may have a higher priority. In this case, when SCell #1 is changed to the deactivated or dormancy state during the operation of CCS for the PCell through SCell #1, the UE may perform CCS for the PCell through SCell #2, which has the next priority.

[Method #7] Method for DCI Format 0_0/1_0 Monitoring when SCell-to-PCell CCS is Configured for a Specific SS Set Linked to DCI Format 0_0/1_0 Configured in the PCell (or Scheduled Cell)

When CCS from SCell to PCell is configured, USS set index A linked to DCI format 0_0/1_0 configured in the PCell may be monitored using the following methods.

Method 1: Even when cross-carrier scheduling (from SCell to PCell) is configured, the monitoring of USS set index A may still be performed by the UE in the PCell, that is, the scheduled cell. In this case, in receiving DCI through USS set index A (linked to DCI format 0_1/1_1 and/or DCI format 0_2/1_2) configured in the SCell, that is, the scheduling cell, the CI field may not be configured in the corresponding DCI. Since monitoring of DCI format 0_0/1_0 is still performed in PCell USS set index A, DCI for scheduling PCell data is not transmitted in SCell USS set index A even if CCS is configured. Therefore, it is not necessary to distinguish the scheduled cell by the CI field.

Method #2: for a specific (e.g., smallest or largest) USS set index X among multiple USS sets configured in the SCell, DCI format 0_0/1_0 linked to PCell USS set index A may be configured to be monitored. In other words, monitoring of the DCI format linked to the specific USS set index X configured in the SCell may be canceled. Instead, the UE may attempt to receive DCI format 0_0/1_0 for scheduling the PCell on a monitoring occasion in the SCell configured in the USS set index X. That is, in the SCell USS set index X, the DCI format for scheduling the PCell instead of the DCI format for scheduling the SCell may be monitored. As the number of PDCCH candidates per AL for DCI format 0_0/1_0 assumed by the UE, a value set in PCell USS set index A or a value set in SCell USS set index X may be applied.

Method 3: SCell USS set index A may be configured to monitor DCI format 0_0/1_0 linked to PCell USS set index A. In other words, monitoring of the DCI format linked to SCell USS set index A may be canceled. Instead, the UE may attempt to receive DCI format 0_0/1_0 for scheduling the PCell on a monitoring occasion in the SCell configured in SCell USS set index A. In this case, as the number of PDCCH candidates per AL for DCI format 0_0/1_0 assumed by the UE, a value set in PCell USS set index A or a value set in SCell USS set index A may be applied. When SCell USS set index A is not configured/present, Method #2 may be applied, or monitoring of DCI format 0_0/1_0 configured in PCell USS set index A may be omitted.

Method 4: USS set index B (for SCS) linked to DCI format 0_0/1_0 configured in the SCell may be configured to monitor DCI format 0_0/1_0 linked to PCell USS set index A. Index A and index B are different. In other words, when there is USS set index B associated with SCS DCI format 0_0/1_0 configured in the SCell, monitoring of the DCI format configured in USS set index B may be canceled. Instead, the UE may attempt to receive DCI format 0_0/1_0 for scheduling the PCell on a SCell monitoring occasion configured in USS set index B. In this case, as the number of PDCCH candidates per AL for DCI format 0_0/1_0 assumed by the UE, a value set in PCell USS set index A or a value set in SCell USS set index B may be applied. When SCell USS set index B is not configured/present, Method #2 may be applied, or monitoring of DCI format 0_0/1_0 configured in PCell USS set index A may be omitted.

[Method #8] Even when "CCS from SCell to PCell" is Configured, "SCS from PCell to PCell" May Also be Operated for a CSS Set or the Like. In this Case, for Multiple Scheduling Cells (i.e., (i) PCell and (ii) SCell for CCS of the PCell) Corresponding to One Scheduled Cell, PCell, a Method to Calculate the Number of PDCCH Candidates and/or the Number of Non-Overlapping CCEs (Per Slot) Allowed is Proposed.

Alt 1: All scheduling cells may be included in $N_{cells,X}^{DL,\mu}$ (where X=0 or 1; when X is omitted, the configuration may be applied to X=0 or 1). For example, when it is assumed that 2 15-kHz SCS cells, including 15-kHz SCS PCell, and 4 30-kHz SCS cells are aggregated (i.e., 6 CCs), a configuration may be established such that $N_{cells,0}^{DL,\mu=0}=2$ and $N_{cells,0}^{DL,\mu=1}=4$. In this case, when one of the 30-kHz SCS SCells is configured as a CCS cell for the PCell, a configuration may be established such that $N_{cells,0}^{DL,\mu=0}=2$ and $N_{cells,X}^{DL,\mu}=5$. Thereafter, in the method described with reference to Tables 5 and 6, assuming that $N_{cells,X}^{DL,\mu}=7$, the number of PDCCH candidates and/or the number of non-overlapping CCEs (per slot) allowed may be calculated for multiple scheduling cells corresponding to the PCell. Also, $N_{cells}^{cap}$ may be determined based on this method or the method described with reference to Tables 5 and 6.

Alt 2: Even if the scheduling cells corresponding to the PCell is two cells, PCell and SCell, a certain proportion may be assigned to each cell (e.g., P1 (0≤P1≤1) to PCell and S1 (0≤S1≤1) to SCell, P1+S1=1) to maintain the total sum of the numbers of scheduling cells. For example, when it is assumed that 2 15-kHz SCS cells, including 15-kHz SCS PCell, and 4 30-kHz SCS cells are aggregated (i.e., 6 CCs), a configuration may be established such that $N_{cells,0}^{DL,\mu=0}=2$ and $N_{cells,0}^{DL,\mu=1}=4$. In this case, when one of the 30-kHz SCS SCells is configured as a CCS cell for the PCell, a configuration may be established such that $N_{cells,0}^{\mu=0}=1+P1$ (or $N_{cells,0}^{DL,\mu=0}=2-P1$), $N_{cells,0}^{DL,\mu=1}=4+S1$ (or $N_{cells,0}^{DL,\mu=1}=5-S1$). The values of P1 and S1 may be predefined, set/indicated by the BS, or reported by the UE. As an example, P1=S1=0.5. Thereafter, based on the method described with reference to Tables 5 and 6, the number of PDCCH candidates and/or the number of non-overlapping CCEs (per slot) allowed may be calculated for multiple scheduling cells corresponding to the PCell. Also, $N_{cells}^{cap}$ may be determined based on this method or the method described with reference to Tables 5 and 6.

<Case 1>
For Alt 1 and Alt 2, when $$\sum_{\mu=0}^{3} \left( N_{cells,0}^{DL,\mu} + \gamma \cdot N_{cells,1}^{DL,\mu} \right) \leq N_{cells}^{cap},$$

the maximum number of PDCCH candidates and/or the maximum number of non-overlapping CCEs for each scheduling cell for each neurology may be determined based on the method described with reference to Tables 5 and 6 (i.e., $M_{PDCCH}^{total,slot,\mu}=M_{PDCCH}^{max,slot,\mu}$ and $C_{PDCCH}^{total,slot,\mu}=C_{PDCCH}^{max,slot,\mu}$ for X=0; $M_{PDCCH}^{total,slot,\mu}=\gamma \cdot M_{PDCCH}^{max,slot,\mu}$ and $C_{PDCCH}^{total,slot,\mu}=\gamma \cdot C_{PDCCH}^{max,slot,\mu}$ for X=1). For example, when Alt 2 is applied to the PCell, which is a scheduled cell, the maximum number of PDCCH candidates and/or the maximum number of non-overlapping CCEs may be determined as P1 times the maximum number of PDCCH candidates and/or the maximum number of non-overlapping CCEs defined based on the numerology of the PCell and S1 times the maximum number of PDCCH candidates and/or the maximum number of non-overlapping CCEs defined based on the numerology of the SCell, one of the scheduling cells. That is, when "CCS from SCell (with μ_s) to PCell (with μ_p)" is configured, the maximum number of PDCCH candidates and/or the maximum number of non-overlapping CCEs may be determined in proportion to P1 and S1. Here, μ_s and μ_p may be the same or different. For example, for "PCell-to-PCell SCS," a configuration may be established such that $M_{PDCCH}^{total,slot,\mu\_p}=P1 \cdot M_{PDCCH}^{max,slot,\mu\_p}$ and $C_{PDCCH}^{total,slot,\mu\_p}=P1 \cdot C_{PDCCH}^{max,slot,\mu\_p}$ for X=0; $M_{PDCCH}^{total,slot,\mu\_p}=\gamma \cdot P1 \cdot M_{PDCCH}^{max,slot,\mu\_p}$ and $C_{PDCCH}^{total,slot,\mu\_p}=\gamma \cdot P1 \cdot C_{PDCCH}^{max,slot,\mu\_p}$ for X=1. In addition, for "SCell-to-PCell CCS," a configuration may be established such that $M_{PDCCH}^{total,slot,\mu\_s}=S1 \cdot$ $M_{PDCCH}^{max,slot,\mu\_s}$ and $C_{PDCCH}^{total,slot,\mu\_s}=S1\cdot C_{PDCCH}^{max,slot,\mu\_s}$ for X=0; $M_{PDCCH}^{total,slot,\mu\_s}=\gamma\cdot S1\cdot M_{PDCCH}^{max,slot,\mu\_s}$ and $C_{PDCCH}^{total,slot,\mu\_s}=\gamma\cdot S1\cdot C_{PDCCH}^{max,slot,\mu\_s}$ for X=1. That is for "PCell-to-PCell SCS," the UE does not need to perform PDCCH monitoring in the PCell for more PDCCH candidates than $M_{PDCCH}^{total,slot,\mu\_p}$ and/or $C_{PDCCH}^{total,slot,\mu\_p}$ candidates. For "SCell-to-PCell CCS," the UE does not need to perform PDCCH monitoring for more PDCCH candidates than $M_{PDCCH}^{total,slot,\mu\_s}$ and/or $C_{PDCCH}^{total,slot,\mu\_s}$ candidates.

<Case 2>
When $$\sum_{\mu=0}^{3}(N_{cells,0}^{DL,\mu}+\gamma\cdot N_{cells,1}^{DL,\mu})>N_{cells}^{cap},$$

the maximum number of PDCCH candidates and/or the maximum number of non-overlapping CCEs ($M_{PDCCH}^{total,slot,\mu}$ and $C_{PDCCH}^{total,slot,\mu}$) for each scheduling cell for each neurology may be determined based on the method described with reference to Tables 5 and 6. That is, $M_{PDCCH}^{total,slot,\mu}=\lfloor N_{cells}^{cap}\cdot M_{PDCCH}^{max,slot,\mu}\cdot(N_{cells,0}^{DL,\mu}+\gamma\cdot N_{cells,1}^{DL,\mu})/\Sigma_{j=0}^{3}(D_{cells,0}^{DL,j}+\gamma\cdot N_{cells,1}^{DL,j})\rfloor$, and $C_{PDCCH}^{total,slot,\mu}=\lfloor N_{cells}^{cap}\cdot C_{PDCCH}^{max,slot,\mu}\cdot(N_{cells,0}^{DL,\mu}+\gamma\cdot N_{cells,1}^{DL,\mu})/\Sigma_{j=0}^{3}(N_{cells,0}^{DL,j}+\gamma\cdot N_{cells,1}^{DL,j})\rfloor$. For the parameters, reference may be made to the description given above described with reference to Alt 1 and Alt 2 and Tables 5 and 6. Accordingly, the UE may skip monitoring more PDCCH candidates than $M_{PDCCH}^{total,slot,\mu}$ candidates or more non-overlapping CCEs than $C_{PDCCH}^{total,slot,\mu}$ candidates per slot in the active DL BWP(s) of the scheduling cell(s) among $N_{cells,0}^{DL,\mu}+N_{cells,1}^{DL,\mu}$ downlink cells. On the other hand, the UE may monitor $M_{PDCCH}^{total,slot,\mu}$ or fewer PDCCH candidates or $C_{PDCCH}^{total,slot,\mu}$ or fewer non-overlapping CCEs per slot in the active DL BWP(s) of the scheduling cell(s) among the $N_{cells,0}^{DL,\mu}+N_{cells,1}^{DL,\mu}$ downlink cells.

[Method #9] Even when "CCS from SCell to PCell" is Configured, "SCS from PCell to PCell" May Also be Operated for a CSS Set or the Like. In this Case, an SS Set Drop Rule According to Overbooking of the Number of PDCCH Candidates (and/or the Number of Non-Overlapping CCEs) is Proposed for Multiple Scheduling Cells (i.e., (i) PCell and (ii) SCell for CCS of the PCell) Corresponding to One Scheduled Cell.

When Method #8 is applied (when μ_s and μ_p are different), SS sets to be dropped may be determined for each scheduling cell (or each numerology) according to the pseudocode of Table 7. In Table 7, the subcarrier spacing (SCS) configuration u may be substituted with SCell SCS configuration μ_s and PCell SCS configuration μ_p. When the pseudocode of Table 7 is applied to μ_s, $M_{PDCCH}^{css}$ and/or $C_{PDCCH}^{css}$ may be 0 (the CSS is not present in the SCell), and be applied only to the SCell SS set taking the PCell as a scheduled cell (that is, it may not be applied to the SCell SS set taking only the SCell as a scheduled cell). Alternatively, the pseudocode of Table 7 may not be applied to μ_s, and the number of PDCCH candidates and/or the number of non-overlapping CCEs allowed (per slot) may be expected not to exceed $\min(M_{PDCCH}^{max,slot,\mu\_s}, M_{PDCCH}^{total,slot,\mu\_s})$, $\min(C_{PDCCH}^{max,slot,\mu\_s}, C_{PDCCH}^{total,slot,\mu\_s})$, $\min(\gamma\cdot M_{PDCCH}^{max,slot,\mu\_s}, M_{PDCCH}^{total,slot,\mu\_s})$ or $\min(\gamma\cdot C_{PDCCH}^{max,slot,\mu\_s}, C_{PDCCH}^{total,slot,\mu\_s})$, or PDCCH monitoring may not be required for more candidates.

In applying the pseudocode of Table 7 based on μ_s (in Alt 2 of Method #8, particularly, in the case where P1=0 and S1=1), a drop rule may be executed (for both the PCell SS set(s); and the SCell SS set(s) for scheduling the PCell) based on only the number of PDCCH candidates and/or the number of non-overlapping CCEs allocated to the SCell (configured to perform CCS for the PCell). That is, when μ_p and μ_s are different in executing the pseudocode of Table 7 based on μ_s, an issue may be raised in calculating $M_{PDCCH}^{css}$ and/or $C_{PDCCH}^{css}$, and/or $$\sum_{L}M_{S_{uss}(j)}^{(L)},$$

and/or $\mathcal{C}(V_{CCE}(S_{uss}(j)))$ in the PCell. When μ_s=1 (30 kHz SCS) and μ_p=0 (15 kHz SCS), the PCell facing a specific SCell slot when the pseudocode is applied to the specific slot may be a partial slot. To address this issue, when the start or end symbol of the CORESET in the PCell is included in the specific SCell slot, $M_{PDCCH}^{css}$ and/or $C_{PDCCH}^{css}$ and/or $$\sum_{L}M_{S_{uss}(j)}^{(L)},$$

and/or $\mathcal{C}(V_{CCE}(S_{uss}(j)))$ may be calculated for SS sets linked to the CORESET.

In other words, when the pseudocode in Table 7 is applied, $M_{PDCCH}^{max,slot,\mu\_s}$, $M_{PDCCH}^{total,slot,\mu\_s}$, $C_{PDCCH}^{max,slot,\mu\_s}$, or $C_{PDCCH}^{total,slot,\mu\_s}$ (e.g., the value of M or C obtained by applying Method #8) may be determined based on μ_s, and be applied to both the PCell SS set(s) and the SCell SS set(s) for scheduling the PCell. In this case, in calculating $M_{PDCCH}^{css}$ and/or $C_{PDCCH}^{css}$ and/or $$\sum_{L}M_{S_{uss}(j)}^{(L)},$$

and/or $\mathcal{C}(V_{CCE}(S_{uss}(j)))$ for the PCell, when μ_s>μ_p, and the start or end symbol of the PCell CORESET is included in the SCell slot (to which the pseudocode is applied) (or the PCell CORESET fully overlaps with the SCell slot), the number of PDCCH candidates and the number of non-overlapping CCEs in the SS set linked to the CORESET may be reflected in $M_{PDCCH}^{css}$ and/or $C_{PDCCH}^{css}$ and/or $$\sum_{L}M_{S_{uss}(j)}^{(L)},$$

and/or $\mathcal{C}(V_{CCE}(S_{uss}(j)))$. Alternatively, in calculating $M_{PDCCH}^{css}$ and/or $C_{PDCCH}^{css}$ and/or $$\sum_{L}M_{S_{uss}(j)}^{(L)},$$

and/or $\mathcal{C}(V_{CCE}(S_{uss}(j)))$ for the PCell, when μ_s<μ_p, the number of PDCCH candidates and the number of non-overlapping CCEs in the SS set corresponding to multiple PCell slots facing the SCell slot (to which the pseudocode is applied) may be reflected in $M_{PDCCH}^{css}$, and/or $C_{PDCCH}^{css}$, and/or $$\sum_L M_{S_{uss}(j)}^{(L)},$$

and/or $\ell$ ($V_{CCE}(S_{uss}(j))$).

In addition, in applying the pseudocode of Table 7 to μ_s (in Alt 2 of Method #8, particularly, in the case where P1=0 and S1=1), a drop rule may be executed (for both the PCell SS set(s); and the SCell SS set(s) for scheduling the PCell) based on only the number of PDCCH candidates and/or the number of non-overlapping CCEs allocated to the SCell (configured to perform CCS for the PCell). The following options may be considered.

Opt 1: For SS set index A (configured for PCell), when PCell scheduling is limited/defined to be configured in only one of PCell SS set index A and SCell SS set index A through CCS configuration, the pseudocode may be applied in order of SS set indexes order (i.e., regardless of cell index) as in the previous case.

Opt 2: For SS set index A (configured for PCell), when PCell scheduling is allowed in both PCell SS set index A and SCell SS set index A through CCS configurations:

Opt 2-1: A tie-breaking rule may be needed for the same SS set index, and a specific cell index (PCell or Scell) may be prioritized.

Opt 2-2: A tie-breaking rule may be needed for the same SS set index, and a specific numerology (e.g., SCS_u) may be prioritized. For example, as p increases or decreases, it may be prioritized.

Opt 3: SS sets scheduled from the PCell (or SCell) may be preferentially dropped. When necessary, SS sets scheduled from the SCell (or PCell) may be additionally dropped.

Opt 4: SS sets for scheduling PCell may be preferentially dropped in a lower (or higher) SCS_u cell. When necessary, SS sets for scheduling the PCell may be additionally dropped in a higher (or lower) SCS_u cell.

[Method #10] Even when "CCS from SCell to PCell" is configured, "SCS from PCell to PCell" may also be operated in a CSS set or the like. In this case, there may be multiple scheduling cells (i.e., (i) PCell and (ii) SCell for CCS of the PCell) corresponding to one scheduled cell, PCell. Whether PDSCH(s) is received (or whether PUSCH(s) is transmitted) on a PCell in a specific slot scheduled from two scheduling cells may depend on the capability of the UE. As an example, only a UE capable of reception from multiple transmission and reception points (TRPs) may be allowed to receive multiple PDSCHs that are subjected to FDM while overlapping in time within the same specific slot on the PCell, scheduled from two scheduling cells (i.e., (i) a PCell and (ii) an SCell for CCS of the PCell). On the other hand, a UE incapable of reception from multiple TRPs may not expect scheduling/reception of multiple PDSCHs (that are subjected to FDM while overlapping in time within the same specific slot on the PCell, scheduled from two scheduling cells). As another example, only a UE capable of transmission to multiple TRPs may be allowed to transmit multiple PUSCHs that are subjected to FDM while overlapping in time within the same specific slot on the PCell, scheduled from two scheduling cells (i.e., (i) a PCell and (ii) an SCell for CCS of the PCell). On the other hand, a UE incapable of transmission from multiple TRPs may not expect scheduling/reception of multiple PUSCHs (that are subjected to FDM while overlapping in time within the same specific slot on the PCell, scheduled from two scheduling cells).

Being capable of transmission/reception from multiple TRPs may mean that individual DCIs may be received from multiple TRPs for the same serving cell and TDMed or FDMed DL/UL data may be transmitted/received in the same slot. A UE capable of reception from multiple TRPs may be allowed to receive multiple PDSCHs on a PCell in a specific slot scheduled from two scheduling cells (i.e., (i) a PCell and (ii) an SCell for CCS of the PCell). On the other hand, a UE incapable of reception from multiple TRPs may not be allowed to receive multiple PDSCHs on the PCell in the specific slot scheduled from two scheduling cells (i.e., (i) the PCell, and (ii) the SCell for CCS of the PCell). A UE capable of multiple TRP transmissions may be allowed to transmit multiple PUSCHs on a PCell in a specific slot scheduled from two scheduling cells (i.e., (i) a PCell and (ii) an SCell for CCS of the PCell). On the other hand, a UE incapable of multiple TRP transmissions may not be allowed to transmit multiple PUSCHs on the PCell in the specific slot scheduled from two scheduling cells (i.e., (i) the PCell and (ii) the SCell for CCS of the PCell).

2) Transmitter (Entity B (e.g., BS)):

[Method #1A] Method of Configuring Cross-Carrier Scheduling (CCS) for a Specific SS Set Configured in a PCell (or Scheduled Cell)

CCS may be configured for the USS set configured in the PCell. That is, CCS may be configured for an SS set except for the CSS set. For example, the CCS may be configured only for a USS set configured in the PCell linked to a specific DCI format (e.g., DCI format 0_1/1_1 and/or DCI format 0_2/1_2). Accordingly, SCS may still be performed on the PCell in an SS set (e.g., a CSS set) for which CCS is not configured among the SS sets configured in the PCell. Here, the DCI format 0_2/1_2 may minimize the DCI payload size to ensure ultra-reliability. Alternatively, when CCS is configured, the CCS may be configured only for a USS set configured in the PCell, linked to the DCI format in which the carrier indicator (CI) field is configured to be larger than the 0 bit bit-width. Alternatively, an index of an SS set to which CCS is to be applied among the SS set indices that satisfy a specific condition may be configured by higher layer (e.g., RRC) signaling. Here, the SS set index satisfying the specific condition includes, for example, a USS set, a USS set linked to DCI format 0_1/0_2/1_1/1_2, or a USS set linked to a DCI format having the CI field.

As an example, CSS set index 0/1 and USS (w/DCI format 0_1/1_1) set index 2/3 may be configured in the PCell, and USS set index 0/1/2/3 may be configured in the SCell. In this case, when the SCell is set as the scheduling cell of the PCell, the BS may transmit scheduling DCI for the PCell in only USS set index 2/3 in the SCell, which has the same index as USS set index 2/3 linked to the DCI format 0_1/1_1 of the PCell. In this case, in the remaining SS sets in the PCell, that is, CSS set indexes 0/1, the BS may transmit scheduling DCI for the PCell. As another example, CCS may be configured (by higher layer signaling configuration) for only USS set index 2 between USS set indexes 2/3 linked to DCI format 0_1/1_1 of the PCell. In this case, the BS may transmit scheduling DCI for the PCell in only USS set index 2 in the SCell (CCS), and may receive scheduling DCI for the PCell in USS set index 3 in the PCell (SCS). In the remaining SS sets of the PCell, that is, CSS set indexes 0/1, the BS may transmit scheduling DCI for the PCell.

Alternatively, when there is an SS set of the SCell having the same index as a specific SS set index of the PCell, the BS may expect the UE to perform monitoring in the SS sets of both cells even if CCS is configured. In this case, the monitoring occasion may conform to an SS set configuration established in each cell. In addition, the number of PDCCH candidates per AL may be determined as follows (wherein the PDCCH candidates refer to PDCCH candidates corresponding to DCI for scheduling a PDSCH or PUSCH to be transmitted in the PCell, that is, DCI having a value of CI corresponding to the PCell):

OPT1) The SS set configuration established in each cell may be applied;

OPT2) The number of PDCCH candidates in the SS set configuration established in the PCell may be applied to both the PCell and the SCell; or OPT3) A part of the number of PDCCH candidates in the SS set configuration established in the PCell may be applied to the PCell, and the other part may be applied to the SCell.

For example, when the scheduling cell for the PCell is configured as an SCell, SS set index 2 of the PCell and SS set index 2 of the SCell may be linked. When the number of PDCCH candidates at AL=X (where X is a positive integer, e.g., 1) in SS set index 2 of the PCell is set to N1, and the number of PDCCH candidates at AL=X in SS set index 2 of the SCell is set to N2, the BS may expect the UE to monitor DCI for scheduling a PDSCH or PUSCH to be transmitted in the PCell as follows, wherein N1 and N2 denote positive integers:

OPT1: Performing PDCCH blind detection N1 times for AL=1 on a monitoring occasion corresponding to SS set index 2 in the PCell, and N2 times for AL=1 on a monitoring occasion corresponding to SS set index 2 in the SCell;

OPT2: Performing PDCCH blind detection N1 times for AL=1 on a monitoring occasion corresponding to SS set index 2 in the PCell, and N1 times for AL=1 on a monitoring occasion corresponding to SS set index 2 in the SCell;

OPT3: Performing PDCCH blind detection floor or ceiling (N1*R) times for AL=1 on a monitoring occasion corresponding to SS set index 2 in the PCell, {N1−floor or ceiling (N1*R)} times for AL=1 on a monitoring occasion corresponding to SS set index 2 in the SCell. Here, R may be predefined (e.g., R=0.5) or set by the BS, and may be a real number greater than or equal to 0 and less than or equal to 1. Here, floor represents a rounding-down function, and ceiling represents a rounding-up function.

When PDCCH monitoring is performed for an SS set in the SCell having the same index as a specific SS set index configured in the PCell, there may be no corresponding SS set configuration in the SCell. For example, CSS set index 0/1 and USS (w/DCI format 0_1/1_1) set index 2/3 may be configured in the PCell, and USS set index 0/1/2 may be configured in the SCell. In this case, when the SCell is configured as the scheduling cell for the PCell, the BS may expect the UE to perform scheduling DCI reception for the PCell in USS set index 2 in the SCell, which has the same index as SS set index 2 linked to DCI format 0_1/1_1 of the PCell. On the other hand, when there is no SS set configuration of the SCell corresponding to SS set index 3 of the PCell, corresponding PDCCH monitoring (i.e., PDCCH monitoring corresponding to 3, which is the SS set index of the PCell in the SCell) may be skipped. As a result, the transmission region for scheduling DCI for the PDSCH or PUSCH to be transmitted in the PCell may be reduced.

As a method to address this issue, it may be configured/defined to perform PDCCH monitoring by inheriting the configuration of a specific SS set index in the SCell. For example, as in the example above, when there is no SS set configuration of the SCell corresponding to the SS set index 3 of the PCell, the BS may expect the UE to perform DCI reception as many times as the number of PDCCH candidates set in SS set index 3 of the PCell, on a monitoring occasion which is configured in a specific SS set index (e.g., the smallest or largest index) of the SCell (or where the monitoring occasion related parameters configured in SS set index 3 of the PCell are applied to the SCell).

Alternatively, in configuring the CCS, a link relationship may be established between a specific SS set index of the PCell and a corresponding SS set index of the SCell. As an example, CSS set index 0/1 and USS (w/DCI format 0_1/1_1) set index 2/3 may be configured in the PCell, and USS set index 0/1/2 may be configured in the SCell. In this case, when the SCell is configured as the scheduling cell of the PCell, a link relationship may be established between SS set index 2/3, which is linked to DCI format 0_1/1_1 of the PCell, and the USS set index 2 in the SCell. Accordingly, the BS may expect the UE to receive scheduling DCI for the PCell in USS set index 2 in the SCell. For example, in USS set index 2 in the SCell, the BS may expect the UE to receive DCI as many times as the number of PDCCH candidates corresponding to the sum of the numbers of PDCCH candidates configured in SS set index 2/3 of the PCell.

[Method #2A] an SS Set Drop Rule According to Overbooking of the Maximum Number of PDCCH Candidates and CCEs when CCS Having the PCell as a Scheduled Cell is Configured Based on that CCS having the PCell as a scheduled cell is configured, when the SS set drop rule is applied (see Table 7) as a number greater than the maximum number of PDCCH candidates and/or CCEs is set in a slot, the number of PDCCH candidates and/or CCEs in the slot for the USS set(s) in the SCell having the same index as specific USS set(s) should be considered. Here, the specific USS set may be determined by Method #1A.

FIG. 10 illustrates an SS set drop rule applied when SCS is configured for the PCell. Referring to FIG. 10, for the PCell, CSS set index 0 (in which the number of PDCCH candidates is set to 30) and USS set index 1/2 (in which the number of PDCCH candidates is set to 10 and 8, respectively) may be configured. For the SCell, USS set index 1/2 (in which the number of PDCCH candidates is set to 12 and 5, respectively) may be configured. Assuming that the maximum number of PDCCH candidates that the UE may monitor per cell and per slot is 44, the SS set drop rule may be applied because the preset number of PDCCH candidates for slot #n of the PCell is 48 (=30+10+8). Accordingly, PCell USS set index 2 may be dropped in slot #n. Accordingly, the number of PDCCH candidates that the UE actually monitors in slot #n of the PCell is 40 (=30+10).

FIG. 11 illustrates an SS set drop rule applied when CCS is configured for the PCell. The SS set configuration in the PCell/SCell is the same as that of FIG. 10. Referring to FIG. 11, when the scheduling cell for the PCell is configured as the SCell, for the PCell, monitoring of CSS set index 0 may be still performed in the PCell, but monitoring of USS set index 1/2 may be performed in the SCell. In this case, the UE may monitor USS set index 1 (in which 22 PDCCH candidates are configured in total, among which 10 candidates are configured for the PCell and the remaining 12 candidates are set for the SCell) for the SCell in slot #n. In this case, in applying the SS set drop rule to slot #n for the PCell, CSS set index 0 for monitoring in the PCell and USS set index 1 for monitoring in the SCell (for PCell) should be considered, unlike in the case of FIG. 10. In this case, since the total number of PDCCH candidates for the PCell is 50 (=30+10+ 10), the BS may expect the UE to drop USS set index 1, and monitor only 44 or fewer (i.e., 30) PDCCH candidates for PCell, wherein 44 is the maximum allowed number. However, the BS may expect the UE to continue to monitor a total of 24 (=12+12) PDCCH candidates for the SCell configured in SCell USS set index 1 in slot #n.

Even if CCS is configured for the PCell as in Method #1A (e.g., OPT1/2/3), some USS sets may still be configured such that monitoring will continue to be performed in the PCell (and the SCell). In this case, in applying the SS set drop rule to slot #n, not only the number of PDCCH candidates and/or CCEs configured in the PCell USS set, but also the number of PDCCH candidates and/or CCEs configured in the SCell USS set having the same index as the PCell USS set should be considered. Here, the number of PDCCH candidates and/or CCEs configured in the SCell USS set having the same index as the PCell USS set means the number of PDCCH candidates and/or CCEs corresponding to DCI for scheduling a PDSCH or PUSCH to be transmitted in the PCell.

[Method #3A] Method of CCS for the PCell when the Scheduling Cell for the PCell is in a Deactivated (or Dormancy) State When data transmission is not required in a specific cell (e.g., SCell), the cell may be transitioned to the deactivated or dormancy state in order to reduce power consumption of the UE. In the deactivated or dormancy, the UE may not perform at least PDCCH monitoring in the cell. Transition of the cell to the deactivated or dormancy state transition may be configured/indicated through higher layer signaling (e.g., RRC or medium access control (MAC) signaling) or DCI, and/or the UE may be configured to transition to the deactivated or dormancy state when the value of a timer exceeds a certain level (e.g., the timer expires). Here, the deactivated or dormancy state means that at least PDCCH monitoring is not performed in the cell (that is, there is no PDCCH transmission by the BS), and may be substituted with other equivalent terms.

When the CCS is configured and there is an SCell configured as a scheduling cell for the PCell, the SCell may be changed to an deactivated or dormancy state. In this case, when PDCCH monitoring in the SCell is all turned off, scheduling DCI transmission resources for the PDSCH or PUSCH to be transmitted in the PCell may become insufficient. To address this issue, the following methods may be used.

Alt 1: When the SCell is changed to the deactivated or dormancy state, the CCS configuration for the PCell may be canceled and the PCell may be automatically switched to self-carrier scheduling (SCS). For example, when the SCell is changed to the deactivated or dormancy state, while the UE receives CCS for the PCell in SCell USS set index 2/3, the BS may expect the UE to receive SCS in PCell USS set index 2/3.

Alt 2: Even when the SCell is changed to the deactivated or dormancy state, the UE operation may be defined to continue receiving the CCS for the PCell in the SCell. For example, while the UE is receiving the CCS for the PCell in SCell USS set index 2/3, the SCell may be changed to the deactivated or dormancy state. In this case, in SCell USS set index 2/3, the BS may expect the UE to receive only the CCS for the PCell and not to perform other PDCCH monitoring (e.g., PDCCH monitoring for the SCell).

Alt 3: Even when CCS is configured for PCell, PDCCH monitoring for scheduling a PCell may be configured for both PCell/SCell. Thereafter, when the SCell is changed to the deactivated or dormancy state, the UE operation may be defined to either turn off all PDCCH monitoring in the SCell or to continue receiving only the CCS for the PCell in the SCell as in the case of Alt 2. As an example, while performing SCS for the PCell in PCell USS set index 2/3, the UE may receive CCS for the PCell in SCell USS set index 2/3. Thereafter, when the SCell is changed to the deactivated or dormancy state, all PDCCH monitoring in the SCell may be turned OFF, or the BS may expect the UE to receive only the CCS for the PCell and not to perform other PDCCH monitoring in SCell USS set index 2/3.

Alt 4: For the SCell configured as the scheduling cell for the PCell, it may be assumed that the deactivation timer is not set or that the UE does not operate the deactivation timer even if the timer is set, or the deactivation timer may be separately configured to have a relatively long time value. In addition, the BS may not transmit signaling for configuring/indicating deactivation or dormancy for the SCell.

Similarly, a solution may also be needed when BWP switching is performed in the scheduling SCell. Specifically, when the deactivation timer for the BWP is set, and there is no PDCCH reception during the timer period in the active BWP, the UE may perform switching to a preset specific BWP (e.g., default BWP, initial BWP, etc.). However, the specific BWP may have a relatively small frequency resource or sparse monitoring occasions compared to the active BWP for the purpose of power saving of the UE, and thus the DCI transmission region for scheduling data in the PCell may be small. To address this issue, for the SCell configured as the scheduling cell for the PCell, it may be assumed that the BWP deactivation timer is not operated or that the UE does not operate the BWP deactivation timer even if the timer is set, or the BWP deactivation timer may be separately set to a relatively long time value. Alternatively, when switching to a preset specific BWP (e.g., default BWP, initial BWP, etc.) as the timer expires, the BS may ensure that an SS set in which CCS with the PCell is possible is configured in the BWP. Alternatively, when switching to a preset specific BWP (e.g., default BWP or initial BWP, etc.) as the timer expires, the CCS configuration for the PCell may be canceled (if the BWP has no SS set in which CCS with the PCell is possible), and the PCell may be automatically switched to the SCS.

[Method #4A] Reporting a Preferred Scheduling SCell

When there are multiple SCells linked to the PCell from the perspective of the UE, the UE may report preferred SCell(s) (hereinafter, a preferred SCell list) (as a scheduling cell of the PCell). Among the multiple SCells, an SCell expected to have good reception performance may be selected as a scheduling cell for a PDSCH or PUSCH to be transmitted in the PCell. However, when the BS selects/configures a scheduling SCell suitable for PDCCH transmission, it may be difficult to select an appropriate SCell without assistance information from the UE. Accordingly, the BS may select an appropriate scheduling SCell based on the preferred SCell list reported from the UE. For reporting on the preferred SCell list, resources through which reporting is to be periodically performed may be configured for the UE. As an example, information related to the preferred SCell list may be transmitted through (periodic or semi-persistent) PUCCH, may be partially carried in UCI piggybacking on the PUSCH, or may be transmitted through a MAC control element (CE). Alternatively, for preferred SCell reporting, an aperiodic reporting resource may be configured. As an example, the information related to the preferred SCell list may be transmitted through a triggered aperiodic PUCCH, partially carried in UCI piggybacking on the PUSCH, transmitted through a MAC CE, or reported through a preset PRACH preamble resource.

[Method #5A] Setting a Value of a Carrier Indicator (CI) for the PCell when CCS is Configured for the PCell When CCS is configured in the NR system, the scheduling cell is defined to take 0 as the CI value when scheduling itself, and take a set CI value when scheduling other cells. In other words, in the case where the SCell is configured as a scheduling cell of the PCell, the CI value may be 0 when the SCell is scheduled, and a set CI value may be used when the PCell is scheduled. On the other hand, in the case where the PCell is configured as a scheduled cell, CI corresponding to the PCell may be predefined as 0 (or 1). When the CI corresponding to the PCell is 0, the CI corresponding to the scheduling SCell may be predefined as 1.

[Method #6A] Configuring/Indicating a Scheduling SCell for PCell when CCS is Configured for the PCell As in Method #3A, it may be difficult to fully support CCS through the SCell for reasons such as switching of the SCell configured as the scheduling cell for the PCell to the deactivated or dormancy state. In preparation for such a situation, it is necessary to increase the flexibility of configuration of a scheduling SCell in configuring CCS for the PCell. As a method, an indication of the scheduling SCell may be signaled through MAC CE or DCI rather than higher layer (e.g., RRC) signaling. As an example, change (e.g., SCell index or serving cell index) of a scheduling cell may be signaled in DCI information transmitted through a CSS set in the PCell. In preparation for an issue raised when the UE misses the signaling, the UE receiving the signaling may inform the BS of whether it has received the signaling by transmitting a confirmation MAC CE or a corresponding HARQ-ACK. Alternatively, in configuring CCS for the PCell, one or more corresponding (candidate) scheduling SCell(s) may be configured. For priorities of multiple (candidate) scheduling SCells, a rule may be predefined (e.g., the smallest or largest serving cell index is prioritized (among the activated cells)), or priorities may be configured. For example, as candidate scheduling SCells, SCell #1 and SCell #2 may be configured, and SCell #1 may have a higher priority. In this case, when SCell #1 is changed to the deactivated or dormancy state during the operation of CCS for the PCell through SCell #1, the BS may expect the UE to perform CCS for the PCell through SCell #2, which has the next priority.

[Method #7A] Method for DCI Format 0_0/1_0 Scheduling when SCell-to-PCell CCS is Configured for a Specific SS Set Linked to DCI Format 0_0/1_0 Configured in the PCell (or Scheduled Cell)

When CCS from SCell to PCell is configured, USS set index A linked to DCI format 0_0/1_0 configured in the PCell may be monitored using the following methods.

Method 1: Even when cross-carrier scheduling (from SCell to PCell) is configured, the scheduling of USS set index A by the BS may still be performed in the PCell, that is, the scheduled cell. In this case, in transmitting DCI through USS set index A (linked to DCI format 0_1/1_1 and/or DCI format 0_2/1_2) configured in the SCell, that is, the scheduling cell, the CI field may not be configured in the corresponding DCI. Since scheduling of DCI format 0_0/1_0 is still performed in PCell USS set index A, DCI for scheduling PCell data is not transmitted in SCell USS set index A even if CCS is configured. Therefore, it is not necessary to distinguish the scheduled cell by the CI field.

Method #2: for a specific (e.g., smallest or largest) USS set index X among multiple USS sets configured in the SCell, DCI format 0_0/1_0 linked to PCell USS set index A may be configured to be scheduled. In other words, scheduling of the DCI format linked to the specific USS set index X configured in the SCell may be canceled. Instead, the BS may transmit DCI format 0_0/1_0 for scheduling the PCell on a monitoring occasion in the SCell configured in the USS set index X. That is, in SCell USS set index X, the BS may schedule the DCI format for scheduling the PCell instead of the DCI format for scheduling the SCell. As the number of PDCCH candidates per AL for DCI format 0_0/1_0 assumed by the UE, a value set in PCell USS set index A or a value set in SCell USS set index X may be applied.

Method 3: SCell USS set index A may be configured to schedule DCI format 0_0/1_0 linked to PCell USS set index A. In other words, scheduling of the DCI format linked to SCell USS set index A may be canceled. Instead, the BS may transmit DCI format 0_0/1_0 for scheduling the PCell on a monitoring occasion in the SCell configured in SCell USS set index A. In this case, as the number of PDCCH candidates per AL for DCI format 0_0/1_0 assumed by the UE, a value set in PCell USS set index A or a value set in SCell USS set index A may be applied. When SCell USS set index A is not configured/present, Method #2 may be applied, or monitoring of DCI format 0_0/1_0 configured in PCell USS set index A may be omitted.

Method 4: USS set index B (for SCS) linked to DCI format 0_0/1_0 configured in the SCell may be configured to scheduling DCI format 0_0/1_0 linked to PCell USS set index A. Index A and index B are different. In other words, when there is USS set index B associated with SCS DCI format 0_0/1_0 configured in the SCell, scheduling of the DCI format configured in USS set index B may be canceled. Instead, the BS may transmit DCI format 0_0/1_0 for scheduling the PCell on a SCell monitoring occasion configured in USS set index B. In this case, as the number of PDCCH candidates per AL for DCI format 0_0/1_0 assumed by the UE, a value set in PCell USS set index A or a value set in SCell USS set index B may be applied. When SCell USS set index B is not configured/present, Method #2 may be applied, or scheduling of DCI format 0_0/1_0 configured in PCell USS set index A may be omitted.

[Method #8A] Even when "CCS from SCell to PCell" is Configured, "SCS from PCell to PCell" May Also be Operated for a CSS Set or the Like. In This Case, for Multiple Scheduling Cells (i.e., (i) PCell and (ii) SCell for CCS of the PCell) Corresponding to One Scheduled Cell, PCell, a Method to Calculate the Number of PDCCH Candidates and/or the Number of Non-Overlapping CCEs (Per Slot) Allowed is Proposed.

Alt 1: All scheduling cells may be included in $N_{cells,X}^{DL,\mu}$ (where X=0 or 1; when X is omitted, the configuration may be applied to X=0 or 1). For example, when it is assumed that 2 15-kHz SCS cells, including 15-kHz SCS PCell, and 4 30-kHz SCS cells are aggregated (i.e., 6 CCs), a configuration may be established such that $N_{cells,0}^{DL,\mu}=2$ and $N_{cells,0}^{DL,\mu=1}=4$. In this case, when one of the 30-kHz SCS SCells is configured as a CCS cell for the PCell, a configuration may be established such that $N_{cells,0}^{DL,\mu=0}=2$ and $N_{cells,0}^{DL,\mu=1}=5$. Thereafter, in the method described with reference to Tables 5 and 6, assuming that $N_{cells,X}^{DL,\mu}=7$, the number of PDCCH candidates and/or the number of non-overlapping CCEs (per slot) allowed may be calculated for multiple scheduling cells corresponding to the PCell. Also, $N_{cells}^{cap}$ may be determined based on this method or the method described with reference to Tables 5 and 6.

Alt 2: Even if the scheduling cells corresponding to the PCell is two cells, PCell and SCell, a certain proportion may be assigned to each cell (e.g., P1 (0≤P1≤1) to PCell and S1 (0≤S1≤1) to SCell, P1+S1=1) to maintain the total sum of the numbers of scheduling cells. For example, when it is assumed that 2 15-kHz SCS cells, including 15-kHz SCS PCell, and 4 30-kHz SCS cells are aggregated (i.e., 6 CCs), a configuration may be established such that $N_{cells,0}^{DL,\mu=0}=2$ and $N_{cells,0}^{DL,\mu=1}=4$. In this case, when one of the 30-kHz SCS SCells is configured as a CCS cell for the PCell, a configuration may be established such that $N_{cells,0}^{DL,\mu=0}=1+$P1 (or $N_{cells,0}^{DL,\mu=0}=2-P1$), $N_{cells,0}^{DL,\mu=1}=4+S1$ (or $N_{cells,0}^{DL,\mu=1}=5-S1$). The values of P1 and S1 may be predefined, set/indicated by the BS, or reported by the UE. As an example, P1=S1=0.5. Thereafter, based on the method described with reference to Tables 5 and 6, the number of PDCCH candidates and/or the number of non-overlapping CCEs (per slot) allowed may be calculated for multiple scheduling cells corresponding to the PCell. Also, $N_{cells}^{cap}$ may be determined based on this method or the method described with reference to Tables 5 and 6.

<Case 1>
For Alt 1 and Alt 2, when $$\sum_{\mu=0}^{3}\left(N_{cells,0}^{DL,\mu}+\gamma\cdot N_{cells,1}^{DL,\mu}\right)\leq N_{cells}^{cap},$$

the maximum number of PDCCH candidates and/or the maximum number of non-overlapping CCEs for each scheduling cell for each neurology may be determined based on the method described with reference to Tables 5 and 6 (i.e. $M_{PDCCH}^{total,slot,\mu}=M_{PDCCH}^{max,slot,\mu}$ and $C_{PDCCH}^{total,slot,\mu}=C_{PDCCH}^{max,slot,\mu}$ for X=0; $M_{PDCCH}^{total,slot,\mu}=\gamma\cdot M_{PDCCH}^{max,slot,\mu}$ and $C_{PDCCH}^{total,slot,\mu}=\gamma\cdot C_{PDCCH}^{max,slot,\mu}$ for X=1). For example, when Alt 2 is applied to the PCell, which is a scheduled cell, the maximum number of PDCCH candidates and/or the maximum number of non-overlapping CCEs may be determined as P1 times the maximum number of PDCCH candidates and/or the maximum number of non-overlapping CCEs defined based on the numerology of the PCell and S1 times the maximum number of PDCCH candidates and/or the maximum number of non-overlapping CCEs defined based on the numerology of the SCell, one of the scheduling cells. That is, when "CCS from SCell (with µ_s) to PCell (with µ_p)" is configured, the maximum number of PDCCH candidates and/or the maximum number of non-overlapping CCEs may be determined in proportion to P1 and S1. Here, µ_s and µ_p may be the same or different. For example, for "PCell-to-PCell SCS," a configuration may be established such that $M_{PDCCH}^{total,slot,\mu\_p}=P1\cdot M_{PDCCH}^{max,slot,\mu\_p}$ and $C_{PDCCH}^{total,slot,\mu\_p}=P1\cdot C_{PDCCH}^{max,slot,\mu\_p}$ for X=0; $M_{PDCCH}^{total,slot,\mu\_p}=\gamma\cdot P1\cdot M_{PDCCH}^{max,slot,\mu\_p}$ and $C_{PDCCH}^{total,slot,\mu\_p}=\gamma\cdot P1\cdot C_{PDCCH}^{max,slot,\mu\_p}$ for X=1. In addition, for "SCell-to-PCell CCS," a configuration may be established such that $M_{PDCCH}^{total,slot,\mu\_s}=S1\cdot M_{PDCCH}^{max,slot,\mu\_s}$ and $C_{PDCCH}^{total,slot,\mu\_s}=S1\cdot C_{PDCCH}^{max,slot,\mu\_s}$ for X=0; $M_{PDCCH}^{total,slot,\mu\_s}=\gamma\cdot S1\cdot M_{PDCCH}^{max,slot,\mu\_s}$ and $C_{PDCCH}^{total,slot,\mu\_s}=\gamma\cdot S1\cdot C_{PDCCH}^{max,slot,\mu\_s}$ for X=1. That is, for "PCell-to-PCell SCS," the BS does not need to transmit more PDCCH candidates than $M_{PDCCH}^{total,slot,\mu\_p}$ and/or $C_{PDCCH}^{total,slot,\mu\_p}$ candidates in the PCell. For "SCell-to-PCell CCS," the BS does not need to perform transmit more PDCCH candidates than $M_{PDCCH}^{total,slot,\mu\_s}$ and/or $C_{PDCCH}^{total,slot,\mu\_s}$ candidates.

<Case 2>
When $$\sum_{\mu=0}^{3}\left(N_{cells,0}^{DL,\mu}+\gamma\cdot N_{cells,1}^{DL,\mu}\right)>N_{cells}^{cap},$$

the maximum number of PDCCH candidates and/or the maximum number of non-overlapping CCEs ($M_{PDCCH}^{total,slot,\mu}$ and $C_{PDCCH}^{total,slot,\mu}$) for each scheduling cell for each neurology may be determined based on the method described with reference to Tables 5 and 6. That is, $M_{PDCCH}^{total,slot,\mu}=\lfloor N_{cells}^{cap}\cdot M_{PDCCH}^{max,slot,\mu}$.

$$\left(N_{cells,0}^{DL,\mu}+\gamma\cdot N_{cells,1}^{DL,\mu}\right)/\sum_{j=0}^{3}\left(N_{cells,0}^{DL,j}+\gamma\cdot N_{cells,1}^{DL,j}\right)\rfloor,$$

and $C_{PDCCH}^{total,slot,\mu}=\lfloor N_{cells}^{cap}\cdot C_{PDCCH}^{max,slot,\mu}$.

$$\left(N_{cells,0}^{DL,\mu}+\gamma\cdot N_{cells,1}^{DL,\mu}\right)/\sum_{j=0}^{3}\left(N_{cells,0}^{DL,j}+\gamma\cdot N_{cells,1}^{DL,j}\right)\rfloor.$$

For the parameters, reference may be made to the description given above described with reference to Alt 1 and Alt 2 and Tables 5 and 6. Accordingly, the BS may skip transmitting more PDCCH candidates than $M_{PDCCH}^{total,slot,\mu}$ candidates or more non-overlapping CCEs than $C_{total,slot,\mu}$ candidates per slot in the active DL BWP(s) of the scheduling cell(s) among $N_{cells,0}^{DL,\mu}+N_{cells,1}^{DL,\mu}$ downlink cells. On the other hand, the BS may transmit $M_{PDCCH}^{total,slot,\mu}$ or fewer PDCCH candidates or $C_{PDCCH}^{total,slot,\mu}$ or fewer non-overlapping CCEs per slot in the active DL BWP(s) of the scheduling cell(s) among the $N_{cells,0}^{DL,\mu}+N_{cells,1}^{DL,\mu}$ downlink cells.

[Method #9A] Even when "CCS from SCell to PCell" is Configured, "SCS from PCell to PCell" May Also be Operated for a CSS Set or the Like. In this Case, an SS Set Drop Rule According to Overbooking of the Number of PDCCH Candidates (and/or the Number of Non-Overlapping CCEs) is Proposed for Multiple Scheduling Cells (i.e., (i) PCell and (ii) SCell for CCS of the PCell) Corresponding to One Scheduled Cell.

When Method #8A is applied (when µ_s and µ_p are different), SS sets to be dropped may be determined for each scheduling cell (or each numerology) according to the pseudocode of Table 7. In Table 7, the subcarrier spacing (SCS) configuration u may be substituted with SCell SCS configuration µ_s and PCell SCS configuration µ_p. When the pseudocode of Table 7 is applied to µ_s, $M_{PDCCH}^{css}$ and/or $C_{PDCCH}^{css}$ may be 0 (the CSS is not present in the SCell), and be applied only to the SCell SS set taking the PCell as a scheduled cell (that is, it may not be applied to the SCell SS set taking only the SCell as a scheduled cell). Alternatively, the pseudocode of Table 7 may not be applied to µ_s, and the number of PDCCH candidates and/or the number of non-overlapping CCEs allowed (per slot) may be expected not to exceed $\min(M_{PDCCH}^{max,slot,\mu\_s}$, $M_{PDCCH}^{total,slot,\mu\_s})$, $\min(C_{PDCCH}^{max,slot,\mu\_s}$, $C_{PDCCH}^{total,slot,\mu\_s})$, $\min(\gamma\cdot M_{PDCCH}^{max,slot,\mu\_s}$, $M_{PDCCH}^{total,slot,\mu\_s})$ or $\min(\gamma\cdot C_{PDCCH}^{max,slot,\mu\_s}$, $C_{PDCCH}^{total,slot,\mu\_s})$, or PDCCH monitoring may not be required for more candidates.

In applying the pseudocode of Table 7 based on µ_s (in Alt 2 of Method #8A, particularly, in the case where P1=0 and S1=1), a drop rule may be executed (for both the PCell SS set(s); and the SCell SS set(s) for scheduling the PCell) based on only the number of PDCCH candidates and/or the number of non-overlapping CCEs allocated to the SCell (configured to perform CCS for the PCell). That is, when μ_p and μ_s are different in executing the pseudocode of Table 7 based on μ_s, an issue may be raised in calculating $M_{PDCCH}^{css}$, and/or $C_{PDCCH}^{css}$, and/or $$\sum_L M_{S_{uss}(j)}^{(L)},$$

and/or $\mathcal{C}$ ($V_{CCE}(S_{uss}(j))$) in the PCell. When μ_s=1 (30 kHz SCS) and μ_p=0 (15 kHz SCS), the PCell facing a specific SCell slot when the pseudocode is applied to the specific slot may be a partial slot. To address this issue, when the start or end symbol of the CORESET in the PCell is included in the specific SCell slot, $M_{PDCCH}^{css}$, and/or $C_{PDCCH}^{css}$, and/or $$\sum_L M_{S_{uss}(j)}^{(L)},$$

and/or $\mathcal{C}$ ($V_{CCE}(S_{uss}(j))$) may be calculated for SS sets linked to the CORESET.

In other words, when the pseudocode in Table 7 is applied, $M_{PDCCH}^{max,slot,\mu\_s}$, $M_{PDCCH}^{total,slot,\mu\_s}$, $C_{PDCCH}^{max,slot,\mu\_s}$, or $C_{PDCCH}^{total,slot,\mu\_s}$ (e.g., the value of M or C obtained by applying Method #8A) may be determined based on μ_s, and be applied to both the PCell SS set(s) and the SCell SS set(s) for scheduling the PCell. In this case, in calculating $M_{PDCCH}^{css}$, and/or $C_{PDCCH}^{css}$, and/or $$\sum_L M_{S_{uss}(j)}^{(L)},$$

and/or $\mathcal{C}$ ($V_{CCE}(S_{uss}(j))$) for the PCell, when μ_s>μ_p, and the start or end symbol of the PCell CORESET is included in the SCell slot (to which the pseudocode is applied) (or the PCell CORESET fully overlaps with the SCell slot), the number of PDCCH candidates and the number of non-overlapping CCEs in the SS set linked to the CORESET may be reflected in $M_{PDCCH}^{css}$, and/or $C_{PDCCH}^{css}$, and/or $$\sum_L M_{S_{uss}(j)}^{(L)},$$

and/or $\mathcal{C}$ ($V_{CCE}(S_{uss}(j))$). Alternatively, in calculating $M_{PDCCH}^{css}$, and/or $C_{PDCCH}^{css}$, and/or $$\sum_L M_{S_{uss}(j)}^{(L)},$$

and/or $\mathcal{C}$ ($V_{CCE}(S_{uss}(j))$) for the PCell, when μ_s<μ_p, the number of PDCCH candidates and the number of non-overlapping CCEs in the SS set corresponding to multiple PCell slots facing the SCell slot (to which the pseudocode is applied) may be reflected in $M_{PDCCH}^{css}$, and/or $C_{PDCCH}^{css}$, and/or $$\sum_L M_{S_{uss}(j)}^{(L)},$$

and/or $\mathcal{C}$ ($V_{CCE}(S_{uss}(j))$).

In addition, in applying the pseudocode of Table 7 to μ_s (in Alt 2 of Method #8A, particularly, in the case where P1=0 and S1=1), a drop rule may be executed (for both the PCell SS set(s); and the SCell SS set(s) for scheduling the PCell) based on only the number of PDCCH candidates and/or the number of non-overlapping CCEs allocated to the SCell (configured to perform CCS for the PCell). The following options may be considered.

Opt 1: For SS set index A (configured for PCell), when PCell scheduling is limited/defined to be configured in only one of PCell SS set index A and SCell SS set index A through CCS configuration, the pseudocode may be applied in order of SS set indexes order (i.e., regardless of cell index) as in the previous case.

Opt 2: For SS set index A (configured for PCell), when PCell scheduling is allowed in both PCell SS set index A and SCell SS set index A through CCS configurations:

Opt 2-1: A tie-breaking rule may be needed for the same SS set index, and a specific cell index (PCell or Scell) may be prioritized.

Opt 2-2: A tie-breaking rule may be needed for the same SS set index, and a specific numerology (e.g., SCS_u) may be prioritized. For example, as p increases or decreases, it may be prioritized.

Opt 3: SS sets scheduled from the PCell (or SCell) may be preferentially dropped. When necessary, SS sets scheduled from the SCell (or PCell) may be additionally dropped.

Opt 4: SS sets for scheduling PCell may be preferentially dropped in a lower (or higher) SCS_u cell. When necessary, SS sets for scheduling the PCell may be additionally dropped in a higher (or lower) SCS_u cell.

[Method #10A] Even when "CCS from SCell to PCell" is configured, "SCS from PCell to PCell" may also be operated in a CSS set or the like. In this case, there may be multiple scheduling cells (i.e., (i) PCell and (ii) SCell for CCS of the PCell) corresponding to one scheduled cell, PCell. Whether PDSCH(s) is received (or whether PUSCH(s) is transmitted) on a PCell in a specific slot scheduled from two scheduling cells may depend on the capability of the UE. As an example, only a UE capable of reception from multiple transmission and reception points (TRPs) may be allowed to receive multiple PDSCHs that are subjected to FDM while overlapping in time within the same specific slot on the PCell, scheduled from two scheduling cells (i.e., (i) a PCell and (ii) an SCell for CCS of the PCell). On the other hand, a UE incapable of reception from multiple TRPs may not expect scheduling/reception of multiple PDSCHs (that are subjected to FDM while overlapping in time within the same specific slot on the PCell, scheduled from two scheduling cells). As another example, only a UE capable of transmission to multiple TRPs may be allowed to transmit multiple PUSCHs that are subjected to FDM while overlapping in time within the same specific slot on the PCell, scheduled from two scheduling cells (i.e., (i) a PCell and (ii) an SCell for CCS of the PCell). On the other hand, a UE incapable of transmission from multiple TRPs may not expect scheduling/reception of multiple PUSCHs (that are subjected to FDM while overlapping in time within the same specific slot on the PCell, scheduled from two scheduling cells).

Being capable of transmission/reception from multiple TRPs may mean that individual DCIs may be received from multiple TRPs for the same serving cell and TDMed or FDMed DL/UL data may be transmitted/received in the same slot. A UE capable of reception from multiple TRPs may be allowed to receive multiple PDSCHs on a PCell in a specific slot scheduled from two scheduling cells (i.e., (i)

a PCell and (ii) an SCell for CCS of the PCell). On the other hand, a UE incapable of reception from multiple TRPs may not be allowed to receive multiple PDSCHs on the PCell in the specific slot scheduled from two scheduling cells (i.e., (i) the PCell, and (ii) the SCell for CCS of the PCell). A UE capable of multiple TRP transmissions may be allowed to transmit multiple PUSCHs on a PCell in a specific slot scheduled from two scheduling cells (i.e., (i) a PCell and (ii) an SCell for CCS of the PCell). On the other hand, a UE incapable of multiple TRP transmissions may not be allowed to transmit multiple PUSCHs on the PCell in the specific slot scheduled from two scheduling cells (i.e., (i) the PCell and (ii) the SCell for CCS of the PCell).

3) Receiver & Transmitter (Between Receiver and Transmitter)

Figure 12:
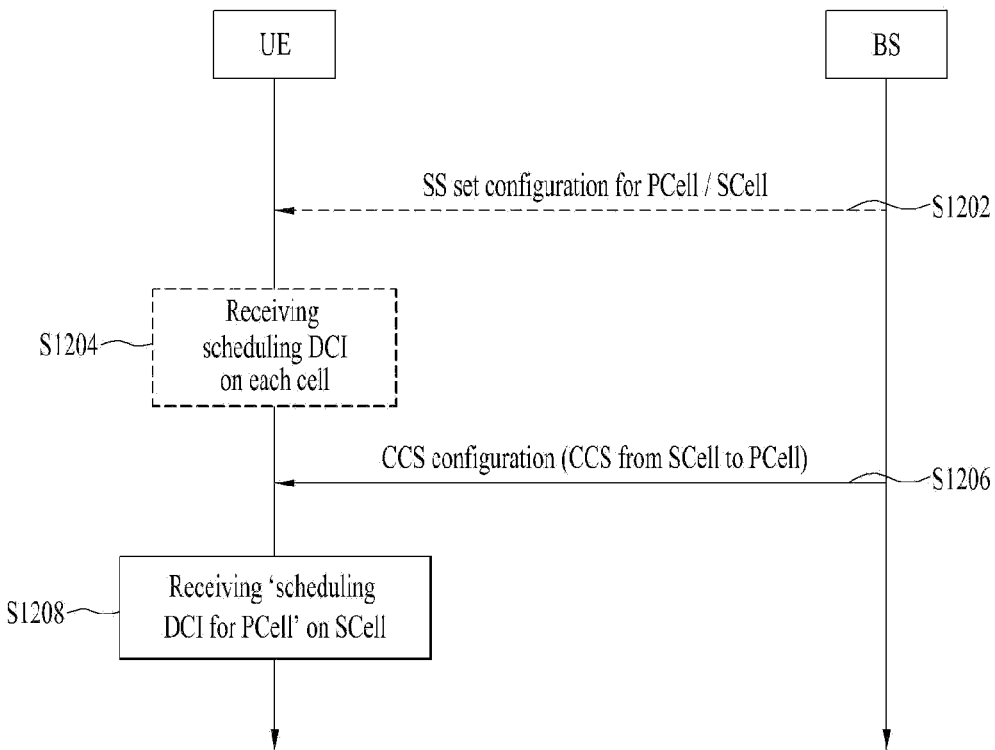

FIG. 12 illustrates a signal transmission/reception procedure according to an example of the present disclosure. Referring to FIG. 12, when a PCell and an SCell are configured through CA from the perspective of a UE, the UE may receive an SS set configuration for each cell (S1202). Thereafter, the UE may receive a PDCCH for scheduling a PCell PDSCH or PUSCH from the PCell, and receive a PDCCH for scheduling an SCell PDSCH or PUSCH from the SCell (S1204). When the CCS configuration in which a scheduling cell for the PCell is configured as the SCell is received based on operation S1202 or a separate operation, the UE may perform PDCCH monitoring in the SCell, not the PCell to receive DCI for scheduling data in the PCell, (S1208). To this end, various proposed methods may be used in combination with each other. An example of the proposed methods is disclosed below.

[Method #1]: PDCCH monitoring may be performed in the SCell, not the PCell, for a specific SS set index in the PCell. The index of an SS set to which CCS is to be applied may be configured by higher layer signaling (e.g., RRC signaling). In addition, even when CCS is configured for the PCell, the UE may perform PDCCH monitoring in all SS sets in the PCell/SCell.

[Method #2]: When a rule of dropping an SS set is applied so as not to exceed the maximum number of PDCCH candidates and/or CCEs allowed per slot, PDCCH candidates monitored in the SCell may be considered. Specifically, when CCS taking the PCell as a scheduled cell is configured, in dropping a specific USS set(s) due to configuration of more than the maximum number of PDCCH candidates and/or the maximum number of CCEs in a specific slot, the number of PDCCH candidates and/or the number of CCEs in the slot for a USS set in the SCell having the same index as the specific USS set may be considered.

[Method #3]: When a scheduling SCell is changed to an deactivated or dormancy state, a scheduling resource for the PCell may be secured. Specifically, even when the SCell is changed to the deactivated or dormancy state, the UE operation may be defined to continue receiving the CCS for the PCell in the SCell.

[Method #6]: Scheduling cell change information (e.g., SCell index or serving cell index) may be signaled through DCI information transmitted through the PCell CS S set.

In addition to the example methods, various methods proposed in the present disclosure may be combined and used in the signal transmission procedure of FIG. 12.

The various descriptions, functions, procedures, proposals, methods, and/or operational flowcharts of the present disclosure described in this document may be applied to, but not limited to, a variety of fields requiring wireless communication/connection (e.g., 5G) between devices.

With reference to the drawings, the present disclosure will be described in greater detail. In the following drawings/description, like reference numerals may denote the same or corresponding hardware blocks, software blocks, or functional blocks, unless otherwise specified.

Figure 13:
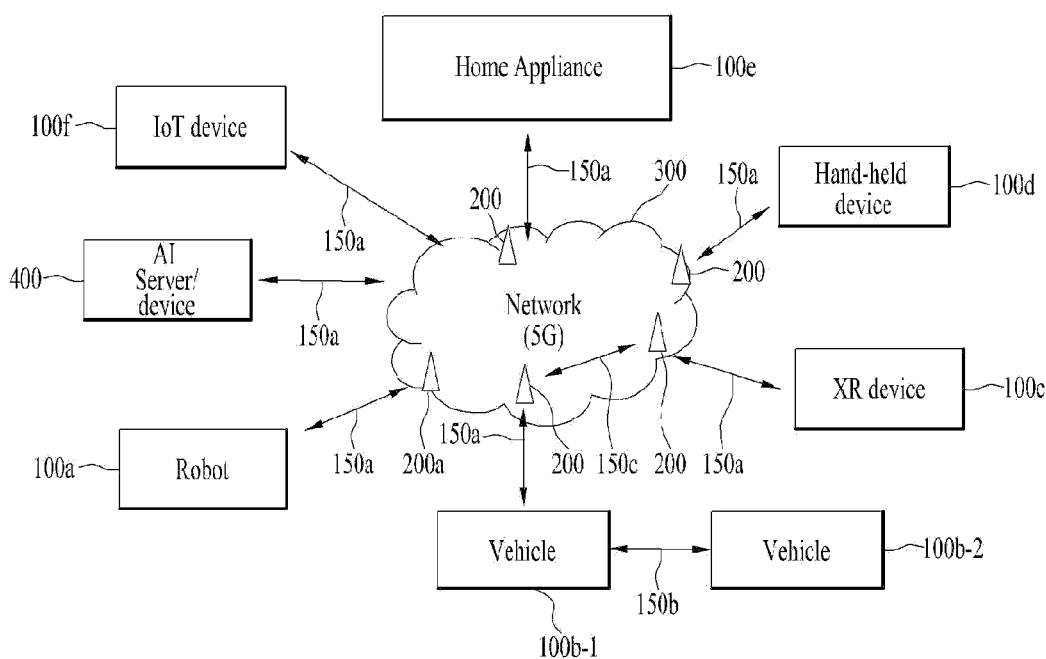
FIGS. 13 to 16 illustrate a communication system 1 and wireless devices applied to the present disclosure.

FIG. 13 illustrates a communication system 1 applied to the present disclosure.

Referring to FIG. 13, a communication system 1 applied to the present disclosure includes wireless devices, Base Stations (BSs), and a network. Herein, the wireless devices represent devices performing communication using Radio Access Technology (RAT) (e.g., 5G New RAT (NR)) or Long-Term Evolution (LTE)) and may be referred to as communication/radio/5G devices. The wireless devices may include, without being limited to, a robot 100a, vehicles 100b-1 and 100b-2, an eXtended Reality (XR) device 100c, a hand-held device 100d, a home appliance 100e, an Internet of Things (IoT) device 100f, and an Artificial Intelligence (AI) device/server 400. For example, the vehicles may include a vehicle having a wireless communication function, an autonomous driving vehicle, and a vehicle capable of performing communication between vehicles. Herein, the vehicles may include an Unmanned Aerial Vehicle (UAV) (e.g., a drone). The XR device may include an Augmented Reality (AR)/Virtual Reality (VR)/Mixed Reality (MR) device and may be implemented in the form of a Head-Mounted Device (HMD), a Head-Up Display (HUD) mounted in a vehicle, a television, a smartphone, a computer, a wearable device, a home appliance device, a digital signage, a vehicle, a robot, etc. The hand-held device may include a smartphone, a smartpad, a wearable device (e.g., a smartwatch or a smartglasses), and a computer (e.g., a notebook). The home appliance may include a TV, a refrigerator, and a washing machine. The IoT device may include a sensor and a smartmeter. For example, the BSs and the network may be implemented as wireless devices and a specific wireless device 200a may operate as a BS/network node with respect to other wireless devices.

The wireless devices 100a to 100f may be connected to the network 300 via the BSs 200. An AI technology may be applied to the wireless devices 100a to 100f and the wireless devices 100a to 100f may be connected to the AI server 400 via the network 300. The network 300 may be configured using a 3G network, a 4G (e.g., LTE) network, or a 5G (e.g., NR) network. Although the wireless devices 100a to 100f may communicate with each other through the BSs 200/network 300, the wireless devices 100a to 100f may perform direct communication (e.g., sidelink communication) with each other without passing through the BS s/network. For example, the vehicles 100b-1 and 100b-2 may perform direct communication (e.g. Vehicle-to-Vehicle (V2V)/Vehicle-to-everything (V2X) communication). The IoT device (e.g., a sensor) may perform direct communication with other IoT devices (e.g., sensors) or other wireless devices 100a to 100f.

Wireless communication/connections 150a, 150b, or 150c may be established between the wireless devices 100a to 100f/BS 200, or BS 200/BS 200. Herein, the wireless communication/connections may be established through various RATs (e.g., 5G NR) such as uplink/downlink communication 150a, sidelink communication 150b (or, D2D communication), or inter BS communication (e.g. relay, Integrated Access Backhaul (IAB)). The wireless devices and the BSs/the wireless devices may transmit/receive radio signals to/from each other through the wireless communication/connections 150*a* and 150*b*. For example, the wireless communication/connections 150*a* and 150*b* may transmit/receive signals through various physical channels. To this end, at least a part of various configuration information configuring processes, various signal processing processes (e.g., channel encoding/decoding, modulation/demodulation, and resource mapping/demapping), and resource allocating processes, for transmitting/receiving radio signals, may be performed based on the various proposals of the present disclosure.

Figure 14:
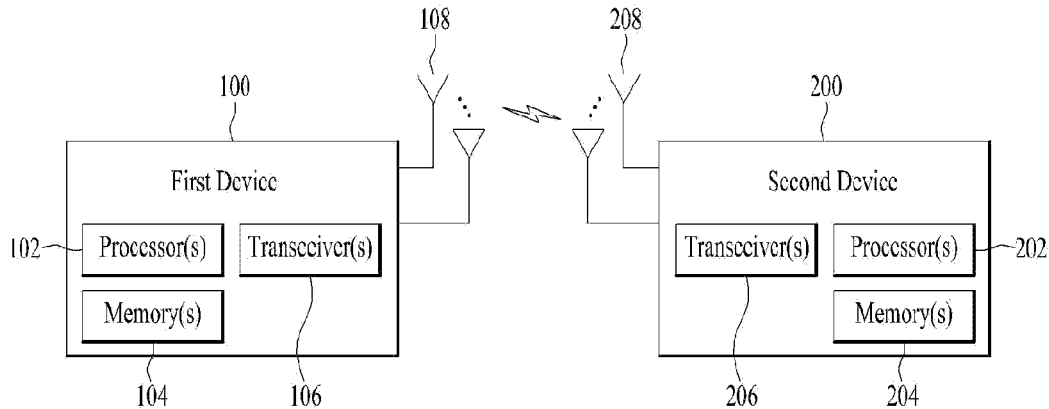

FIG. 14 illustrates wireless devices applicable to the present disclosure.

Referring to FIG. 14, a first wireless device 100 and a second wireless device 200 may transmit radio signals through a variety of RATs (e.g., LTE and NR). Herein, {the first wireless device 100 and the second wireless device 200} may correspond to {the wireless device 100*x* and the BS 200} and/or {the wireless device 100*x* and the wireless device 100*x*} of FIG. 13.

The first wireless device 100 may include one or more processors 102 and one or more memories 104 and additionally further include one or more transceivers 106 and/or one or more antennas 108. The processor(s) 102 may control the memory(s) 104 and/or the transceiver(s) 106 and may be configured to implement the descriptions, functions, procedures, proposals, methods, and/or operational flowcharts disclosed in this document. For example, the processor(s) 102 may process information within the memory(s) 104 to generate first information/signals and then transmit radio signals including the first information/signals through the transceiver(s) 106. The processor(s) 102 may receive radio signals including second information/signals through the transceiver 106 and then store information obtained by processing the second information/signals in the memory(s) 104. The memory(s) 104 may be connected to the processor(s) 102 and may store a variety of information related to operations of the processor(s) 102. For example, the memory(s) 104 may store software code including commands for performing a part or the entirety of processes controlled by the processor(s) 102 or for performing the descriptions, functions, procedures, proposals, methods, and/or operational flowcharts disclosed in this document. Herein, the processor(s) 102 and the memory(s) 104 may be a part of a communication modem/circuit/chip designed to implement RAT (e.g., LTE or NR). The transceiver(s) 106 may be connected to the processor(s) 102 and transmit and/or receive radio signals through one or more antennas 108. Each of the transceiver(s) 106 may include a transmitter and/or a receiver. The transceiver(s) 106 may be interchangeably used with Radio Frequency (RF) unit(s). In the present disclosure, the wireless device may represent a communication modem/circuit/chip.

The second wireless device 200 may include one or more processors 202 and one or more memories 204 and additionally further include one or more transceivers 206 and/or one or more antennas 208. The processor(s) 202 may control the memory(s) 204 and/or the transceiver(s) 206 and may be configured to implement the descriptions, functions, procedures, proposals, methods, and/or operational flowcharts disclosed in this document. For example, the processor(s) 202 may process information within the memory(s) 204 to generate third information/signals and then transmit radio signals including the third information/signals through the transceiver(s) 206. The processor(s) 202 may receive radio signals including fourth information/signals through the transceiver(s) 106 and then store information obtained by processing the fourth information/signals in the memory(s) 204. The memory(s) 204 may be connected to the processor(s) 202 and may store a variety of information related to operations of the processor(s) 202. For example, the memory(s) 204 may store software code including commands for performing a part or the entirety of processes controlled by the processor(s) 202 or for performing the descriptions, functions, procedures, proposals, methods, and/or operational flowcharts disclosed in this document. Herein, the processor(s) 202 and the memory(s) 204 may be a part of a communication modem/circuit/chip designed to implement RAT (e.g., LTE or NR). The transceiver(s) 206 may be connected to the processor(s) 202 and transmit and/or receive radio signals through one or more antennas 208. Each of the transceiver(s) 206 may include a transmitter and/or a receiver. The transceiver(s) 206 may be interchangeably used with RF unit(s). In the present disclosure, the wireless device may represent a communication modem/circuit/chip.

Hereinafter, hardware elements of the wireless devices 100 and 200 will be described more specifically. One or more protocol layers may be implemented by, without being limited to, one or more processors 102 and 202. For example, the one or more processors 102 and 202 may implement one or more layers (e.g., functional layers such as PHY, MAC, RLC, PDCP, RRC, and SDAP). The one or more processors 102 and 202 may generate one or more Protocol Data Units (PDUs) and/or one or more Service Data Unit (SDUs) according to the descriptions, functions, procedures, proposals, methods, and/or operational flowcharts disclosed in this document. The one or more processors 102 and 202 may generate messages, control information, data, or information according to the descriptions, functions, procedures, proposals, methods, and/or operational flowcharts disclosed in this document. The one or more processors 102 and 202 may generate signals (e.g., baseband signals) including PDUs, SDUs, messages, control information, data, or information according to the descriptions, functions, procedures, proposals, methods, and/or operational flowcharts disclosed in this document and provide the generated signals to the one or more transceivers 106 and 206. The one or more processors 102 and 202 may receive the signals (e.g., baseband signals) from the one or more transceivers 106 and 206 and acquire the PDUs, SDUs, messages, control information, data, or information according to the descriptions, functions, procedures, proposals, methods, and/or operational flowcharts disclosed in this document.

The one or more processors 102 and 202 may be referred to as controllers, microcontrollers, microprocessors, or microcomputers. The one or more processors 102 and 202 may be implemented by hardware, firmware, software, or a combination thereof. As an example, one or more Application Specific Integrated Circuits (ASICs), one or more Digital Signal Processors (DSPs), one or more Digital Signal Processing Devices (DSPDs), one or more Programmable Logic Devices (PLDs), or one or more Field Programmable Gate Arrays (FPGAs) may be included in the one or more processors 102 and 202. The descriptions, functions, procedures, proposals, methods, and/or operational flowcharts disclosed in this document may be implemented using firmware or software and the firmware or software may be configured to include the modules, procedures, or functions. Firmware or software configured to perform the descriptions, functions, procedures, proposals, methods, and/or operational flowcharts disclosed in this document may be included in the one or more processors 102 and 202 or stored in the one or more memories 104 and 204 so as to be driven by the one or more processors 102 and 202. The descriptions, functions, procedures, proposals, methods, and/or operational flowcharts disclosed in this document may be implemented using firmware or software in the form of code, commands, and/or a set of commands The one or more memories 104 and 204 may be connected to the one or more processors 102 and 202 and store various types of data, signals, messages, information, programs, code, instructions, and/or commands. The one or more memories 104 and 204 may be configured by Read-Only Memories (ROMs), Random Access Memories (RAMs), Electrically Erasable Programmable Read-Only Memories (EPROMs), flash memories, hard drives, registers, cash memories, computer-readable storage media, and/or combinations thereof. The one or more memories 104 and 204 may be located at the interior and/or exterior of the one or more processors 102 and 202. The one or more memories 104 and 204 may be connected to the one or more processors 102 and 202 through various technologies such as wired or wireless connection.

The one or more transceivers 106 and 206 may transmit user data, control information, and/or radio signals/channels, mentioned in the methods and/or operational flowcharts of this document, to one or more other devices. The one or more transceivers 106 and 206 may receive user data, control information, and/or radio signals/channels, mentioned in the descriptions, functions, procedures, proposals, methods, and/or operational flowcharts disclosed in this document, from one or more other devices. For example, the one or more transceivers 106 and 206 may be connected to the one or more processors 102 and 202 and transmit and receive radio signals. For example, the one or more processors 102 and 202 may perform control so that the one or more transceivers 106 and 206 may transmit user data, control information, or radio signals to one or more other devices. The one or more processors 102 and 202 may perform control so that the one or more transceivers 106 and 206 may receive user data, control information, or radio signals from one or more other devices. The one or more transceivers 106 and 206 may be connected to the one or more antennas 108 and 208 and the one or more transceivers 106 and 206 may be configured to transmit and receive user data, control information, and/or radio signals/channels, mentioned in the descriptions, functions, procedures, proposals, methods, and/or operational flowcharts disclosed in this document, through the one or more antennas 108 and 208. In this document, the one or more antennas may be a plurality of physical antennas or a plurality of logical antennas (e.g., antenna ports). The one or more transceivers 106 and 206 may convert received radio signals/channels etc. from RF band signals into baseband signals in order to process received user data, control information, radio signals/channels, etc. using the one or more processors 102 and 202. The one or more transceivers 106 and 206 may convert the user data, control information, radio signals/channels, etc. processed using the one or more processors 102 and 202 from the base band signals into the RF band signals. To this end, the one or more transceivers 106 and 206 may include (analog) oscillators and/or filters.

Figure 15:
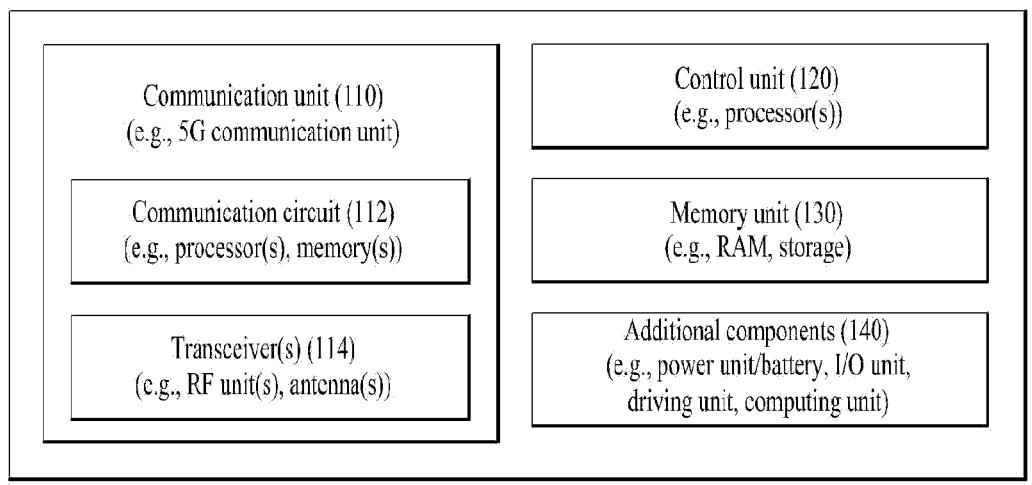

FIG. 15 illustrates another example of a wireless device applied to the present disclosure. The wireless device may be implemented in various forms according to a use-case/service (refer to FIG. 13).

Referring to FIG. 15, wireless devices 100 and 200 may correspond to the wireless devices 100 and 200 of FIG. 14 and may be configured by various elements, components, units/portions, and/or modules. For example, each of the wireless devices 100 and 200 may include a communication unit 110, a control unit 120, a memory unit 130, and additional components 140. The communication unit may include a communication circuit 112 and transceiver(s) 114. For example, the communication circuit 112 may include the one or more processors 102 and 202 and/or the one or more memories 104 and 204 of FIG. 14. For example, the transceiver(s) 114 may include the one or more transceivers 106 and 206 and/or the one or more antennas 108 and 208 of FIG. 14. The control unit 120 is electrically connected to the communication unit 110, the memory 130, and the additional components 140 and controls overall operation of the wireless devices. For example, the control unit 120 may control an electric/mechanical operation of the wireless device based on programs/code/commands/information stored in the memory unit 130. The control unit 120 may transmit the information stored in the memory unit 130 to the exterior (e.g., other communication devices) via the communication unit 110 through a wireless/wired interface or store, in the memory unit 130, information received through the wireless/wired interface from the exterior (e.g., other communication devices) via the communication unit 110.

The additional components 140 may be variously configured according to types of wireless devices. For example, the additional components 140 may include at least one of a power unit/battery, input/output (I/O) unit, a driving unit, and a computing unit. The wireless device may be implemented in the form of, without being limited to, the robot (100a of FIG. 13), the vehicles (100b-1 and 100b-2 of FIG. 13), the XR device (100c of FIG. 13), the hand-held device (100d of FIG. 13), the home appliance (100e of FIG. 13), the IoT device (100f of FIG. 13), a digital broadcast terminal, a hologram device, a public safety device, an MTC device, a medicine device, a fintech device (or a finance device), a security device, a climate/environment device, the AI server/device (400 of FIG. 13), the BSs (200 of FIG. 13), a network node, etc. The wireless device may be used in a mobile or fixed place according to a use-example/service.

In FIG. 15, the entirety of the various elements, components, units/portions, and/or modules in the wireless devices 100 and 200 may be connected to each other through a wired interface or at least a part thereof may be wirelessly connected through the communication unit 110. For example, in each of the wireless devices 100 and 200, the control unit 120 and the communication unit 110 may be connected by wire and the control unit 120 and first units (e.g., 130 and 140) may be wirelessly connected through the communication unit 110. Each element, component, unit/portion, and/or module within the wireless devices 100 and 200 may further include one or more elements. For example, the control unit 120 may be configured by a set of one or more processors. As an example, the control unit 120 may be configured by a set of a communication control processor, an application processor, an Electronic Control Unit (ECU), a graphical processing unit, and a memory control processor. As another example, the memory 130 may be configured by a Random Access Memory (RAM), a Dynamic RAM (DRAM), a Read Only Memory (ROM)), a flash memory, a volatile memory, a non-volatile memory, and/or a combination thereof.

Figure 16:
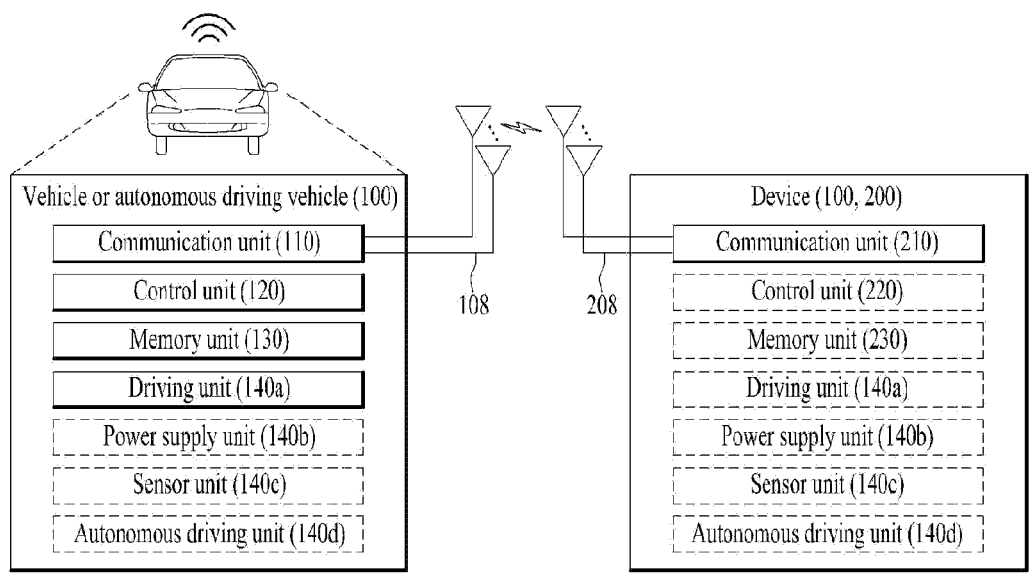

FIG. 16 illustrates a vehicle or an autonomous driving vehicle applied to the present disclosure. The vehicle or autonomous driving vehicle may be implemented by a mobile robot, a car, a train, a manned/unmanned Aerial Vehicle (AV), a ship, etc.

Referring to FIG. 16, a vehicle or autonomous driving vehicle 100 may include an antenna unit 108, a communication unit 110, a control unit 120, a driving unit 140a, a power supply unit 140b, a sensor unit 140c, and an autonomous driving unit 140d. The antenna unit 108 may be configured as a part of the communication unit 110. The blocks 110/130/140a to 140d correspond to the blocks 110/130/140 of FIG. 15, respectively.

The communication unit 110 may transmit and receive signals (e.g., data and control signals) to and from external devices such as other vehicles, BS s (e.g., gNBs and road side units), and servers. The control unit 120 may perform various operations by controlling elements of the vehicle or the autonomous driving vehicle 100. The control unit 120 may include an Electronic Control Unit (ECU). The driving unit 140a may cause the vehicle or the autonomous driving vehicle 100 to drive on a road. The driving unit 140a may include an engine, a motor, a powertrain, a wheel, a brake, a steering device, etc. The power supply unit 140b may supply power to the vehicle or the autonomous driving vehicle 100 and include a wired/wireless charging circuit, a battery, etc. The sensor unit 140c may acquire a vehicle state, ambient environment information, user information, etc. The sensor unit 140c may include an Inertial Measurement Unit (IMU) sensor, a collision sensor, a wheel sensor, a speed sensor, a slope sensor, a weight sensor, a heading sensor, a position module, a vehicle forward/backward sensor, a battery sensor, a fuel sensor, a tire sensor, a steering sensor, a temperature sensor, a humidity sensor, an ultrasonic sensor, an illumination sensor, a pedal position sensor, etc. The autonomous driving unit 140d may implement technology for maintaining a lane on which a vehicle is driving, technology for automatically adjusting speed, such as adaptive cruise control, technology for autonomously driving along a determined path, technology for driving by automatically setting a path if a destination is set, and the like.

For example, the communication unit 110 may receive map data, traffic information data, etc. from an external server. The autonomous driving unit 140d may generate an autonomous driving path and a driving plan from the obtained data. The control unit 120 may control the driving unit 140a such that the vehicle or the autonomous driving vehicle 100 may move along the autonomous driving path according to the driving plan (e.g., speed/direction control). In the middle of autonomous driving, the communication unit 110 may aperiodically/periodically acquire recent traffic information data from the external server and acquire surrounding traffic information data from neighboring vehicles. In the middle of autonomous driving, the sensor unit 140c may obtain a vehicle state and/or surrounding environment information. The autonomous driving unit 140d may update the autonomous driving path and the driving plan based on the newly obtained data/information. The communication unit 110 may transfer information about a vehicle position, the autonomous driving path, and/or the driving plan to the external server. The external server may predict traffic information data using AI technology, etc., based on the information collected from vehicles or autonomous driving vehicles and provide the predicted traffic information data to the vehicles or the autonomous driving vehicles.

The above-described embodiments correspond to combinations of elements and features of the present disclosure in prescribed forms. And, the respective elements or features may be considered as selective unless they are explicitly mentioned. Each of the elements or features can be implemented in a form failing to be combined with other elements or features. Moreover, it is able to implement an embodiment of the present disclosure by combining elements and/or features together in part. A sequence of operations explained for each embodiment of the present disclosure can be modified. Some configurations or features of one embodiment can be included in another embodiment or can be substituted for corresponding configurations or features of another embodiment. And, it is apparently understandable that an embodiment is configured by combining claims failing to have relation of explicit citation in the appended claims together or can be included as new claims by amendment after filing an application.

Those skilled in the art will appreciate that the present disclosure may be carried out in other specific ways than those set forth herein without departing from the spirit and essential characteristics of the present disclosure. The above embodiments are therefore to be construed in all aspects as illustrative and not restrictive. The scope of the disclosure should be determined by the appended claims and their legal equivalents, not by the above description, and all changes coming within the meaning and equivalency range of the appended claims are intended to be embraced therein.

INDUSTRIAL APPLICABILITY

The present disclosure is applicable to UEs, eNBs or other apparatuses of a wireless mobile communication system.

The invention claimed is:

1. A method performed by a user equipment (UE) configured to operate in a wireless communication system, the method comprising:
receiving configuration information for a cross carrier scheduling related to scheduling information for a primary cell from a secondary cell; and
monitoring a physical downlink control channel (PDCCH) related to the scheduling information in a first active downlink bandwidth part (DL BWP) in the primary cell or a second DL BWP in the secondary cell,
wherein, based on a first subcarrier spacing (SCS) for the first active DL BWP that is smaller than a second SCS for the second active DL BWP, a total number of first PDCCH candidates for monitoring the PDCCH per slot in the first DL BWP is determined based on a total sum of scheduling cells, and
wherein the total sum of the scheduling cells is calculated without considering the secondary cell related to the cross carrier scheduling for the primary cell.

2. The method of claim 1, wherein the total sum of the scheduling cells is calculated by including the primary cell that self-carrier schedules the scheduling information for the primary cell in the number of scheduling cells related to the first SCS.

3. The method of claim 1, wherein a total number of second PDCCH candidates for monitoring the PDCCH per slot in the second DL BWP is determined based on the total sum of the scheduling cells.

4. The method of claim 1, wherein (i) a total number of non-overlapped control channel elements (CCEs) per slot on the first active DL BWP, and (ii) a total number of non-overlapped CCEs per slot on the second active DL BWP are determined based on the total sum of the scheduling cells.

5. A user equipment (UE) configured to operate in a wireless communication system, the UE comprising:
a transceiver; and
at least one processor coupled with the transceiver,
wherein the at least one processor is configured to:
receive configuration information for a cross carrier scheduling related to scheduling information for a primary cell from a secondary cell; and monitor a physical downlink control channel (PDCCH) related to the scheduling information in a first active downlink bandwidth part (DL BWP) in the primary cell or a second DL BWP in the secondary cell, wherein, based on a first subcarrier spacing (SCS) for the first active DL BWP that is smaller than a second SCS for the second active DL BWP, a total number of first PDCCH candidates for monitoring the PDCCH per slot in the first DL BWP is determined based on a total sum of scheduling cells, and wherein the total sum of the scheduling cells is calculated without considering the secondary cell related to the cross carrier scheduling for the primary cell.

6. The UE of claim 5, wherein the total sum of the scheduling cells is calculated by including the primary cell that self-carrier schedules the scheduling information for the primary cell in the number of scheduling cells related to the first SCS.

7. The UE of claim 5, wherein a total number of second PDCCH candidates for monitoring the PDCCH per slot in the second DL BWP is determined based on the total sum of the scheduling cells.

8. The UE of claim 5, wherein (i) a total number of non-overlapped control channel elements (CCEs) per slot on the first active DL BWP, and (ii) a total number of non-overlapped CCEs per slot on the second active DL BWP are determined based on the total sum of the scheduling cells.

9. A method performed by a base station (BS) configured to operate in a wireless communication system, the method comprising:

transmitting configuration information for a cross carrier scheduling related to scheduling information for a primary cell from a secondary cell; and transmitting a physical downlink control channel (PDCCH) related to the scheduling information in a first active downlink bandwidth part (DL BWP) in the primary cell or a second DL BWP in the secondary cell, wherein, based on a first subcarrier spacing (SCS) for the first active DL BWP that is smaller than a second SCS for the second active DL BWP, a total number of first PDCCH candidates for monitoring the PDCCH per slot in the first DL BWP is determined based on a total sum of scheduling cells, and wherein the total sum of the scheduling cells is calculated without considering the secondary cell related to the cross carrier scheduling for the primary cell.

10. A base station (BS) configured to operate in a wireless communication system, the BS comprising:

a transceiver; and at least one processor coupled with the transceiver, wherein the at least one processor is configured to:

transmit configuration information for a cross carrier scheduling related to scheduling information for a primary cell from a secondary cell; and transmit a physical downlink control channel (PDCCH) related to the scheduling information in a first active downlink bandwidth part (DL BWP) in the primary cell or a second DL BWP in the secondary cell, wherein, based on a first subcarrier spacing (SCS) for the first active DL BWP that is smaller than a second SCS for the second active DL BWP, a total number of first PDCCH candidates for monitoring the PDCCH per slot in the first DL BWP is determined based on a total sum of scheduling cells, and wherein the total sum of the scheduling cells is calculated without considering the secondary cell related to the cross carrier scheduling for the primary cell.

* * * * *

UNITED STATES PATENT AND TRADEMARK OFFICE
CERTIFICATE OF CORRECTION

Page 1 of 1

PATENT NO. : 11,968,692 B2
APPLICATION NO. : 18/223798
DATED : April 23, 2024
INVENTOR(S) : Seonwook Kim et al.

It is certified that error appears in the above-identified patent and that said Letters Patent is hereby corrected as shown below:

In the Claims

In Claim 1, Column 46, Line 36, "a second DL BWP" should be "a second active DL BWP".
In Claim 1, Column 46, Line 41, "the first DL BWP" should be "the first active DL BWP".
In Claim 3, Column 46, Line 53, "the second DL BWP" should be "the second active DL BWP".
In Claim 5, Column 47, Line 4, "a second DL BWP" should be "a second active DL BWP".
In Claim 5, Column 47, Line 9, "the first DL BWP" should be "the first active DL BWP".
In Claim 7, Column 47, Line 21, "the second DL BWP" should be "the second active DL BWP".
In Claim 9, Column 48, Line 2, "a second DL BWP" should be "a second active DL BWP".
In Claim 9, Column 48, Line 7, "the first DL BWP" should be "the first active DL BWP".
In Claim 10, Column 48, Line 24, "a second DL BWP" should be "a second active DL BWP".
In Claim 10, Column 48, Line 29, "the first DL BWP" should be "the first active DL BWP".

Signed and Sealed this
Thirty-first Day of December, 2024

Derrick Brent
*Acting Director of the United States Patent and Trademark Office*